(12) United States Patent
Stevens

(10) Patent No.: US 10,732,157 B2
(45) Date of Patent: Aug. 4, 2020

(54) TECHNIQUES FOR DISPLAY AND PROCESSING OF MASS SPECTRAL DATA

(71) Applicant: Waters Technologies Corporation, Milford, MA (US)

(72) Inventor: Douglas M. Stevens, Holden, MA (US)

(73) Assignee: Waters Technologies Corporation, Milford, MA (US)

(*) Notice: Subject to any disclaimer, the term of this patent is extended or adjusted under 35 U.S.C. 154(b) by 0 days.

(21) Appl. No.: 15/509,977

(22) PCT Filed: Sep. 11, 2015

(86) PCT No.: PCT/US2015/049581
§ 371 (c)(1),
(2) Date: Mar. 9, 2017

(87) PCT Pub. No.: WO2016/044079
PCT Pub. Date: Mar. 24, 2016

(65) Prior Publication Data
US 2017/0299558 A1    Oct. 19, 2017

Related U.S. Application Data

(60) Provisional application No. 62/050,837, filed on Sep. 16, 2014.

(51) Int. Cl.
*G01N 30/86* (2006.01)
*H01J 49/00* (2006.01)
(Continued)

(52) U.S. Cl.
CPC ....... *G01N 30/8631* (2013.01); *G01N 27/622* (2013.01); *G01N 30/7233* (2013.01);
(Continued)

(58) Field of Classification Search
CPC .................................................. G01N 30/8631
See application file for complete search history.

(56) References Cited

U.S. PATENT DOCUMENTS 6,717,130 B2 * 4/2004 Bateman ............. H01J 49/0045
250/281
8,921,773 B2 * 12/2014 Geromanos ............. H01J 49/14
250/282
(Continued)

OTHER PUBLICATIONS

International Preliminary Report on Patentability (IPRP), PCT Application No. PCT/US2015/049581, dated Mar. 30, 2017.

*Primary Examiner* — Raymond L Nimox

(57) ABSTRACT

Processing mass spectral data may include performing one or more experiments using one or more samples, each experiment including mass analysis using a mass spectrometer; acquiring one or more raw mass spectral data sets as a result of performing the one or more experiments; receiving selection criteria; filtering the one or more raw mass spectral data sets in accordance with the selection criteria; and generating a chromatogram as a result of said filtering, wherein the chromatogram displays signal intensity as a function of scan time for a plurality of scan times and includes a non-zero signal intensity at each scan time only if, at the scan time, the selection criteria is met and otherwise the chromatogram includes a zero signal intensity at the scan time. The mass spectrometer may alternate between low and elevated energy modes and acquire two of the raw mass spectral data sets concurrently.

20 Claims, 15 Drawing Sheets

(51) Int. Cl.
*G01N 27/62* (2006.01)
*G01N 30/72* (2006.01)
*H01J 49/40* (2006.01)

(52) U.S. Cl.
CPC ...... *H01J 49/0031* (2013.01); *H01J 49/0036* (2013.01); *H01J 49/40* (2013.01)

(56) References Cited

U.S. PATENT DOCUMENTS

| | | | | |
|---|---|---|---|---|
| 2006/0169885 | A1* | 8/2006 | Castro-Perez | B01D 59/44 250/284 |
| 2006/0284069 | A1* | 12/2006 | Le Blanc | G01N 30/8641 250/282 |
| 2007/0278395 | A1* | 12/2007 | Gorenstein | G01N 30/8675 250/282 |
| 2012/0158318 | A1* | 6/2012 | Wright | G01N 30/8675 702/28 |
| 2012/0241602 | A1* | 9/2012 | Goshawk | H01J 49/0027 250/282 |
| 2014/0038216 | A1 | 2/2014 | Gorenstein et al. | |
| 2014/0138531 | A1* | 5/2014 | Wright | G06F 19/703 250/282 |
| 2014/0142865 | A1* | 5/2014 | Wright | H01J 49/0036 702/23 |
| 2014/0252218 | A1* | 9/2014 | Wright | H01J 49/0036 250/282 |

* cited by examiner

TECHNIQUES FOR DISPLAY AND PROCESSING OF MASS SPECTRAL DATA

REFERENCE TO RELATED APPLICATION(S)

This application is a National Stage of International Application No. PCT/US2015/049581, filed Sep. 11, 2015, which claims priority to U.S. Provisional Application No. 62/050,837, filed Sep. 16, 2014, all of which are incorporated by reference herein.

TECHNICAL FIELD

This application generally relates to techniques for the display and processing of data obtained from performing mass spectral analysis of a sample.

BACKGROUND INFORMATION

Mass spectrometry (MS) is used widely for identifying and quantifying molecular species in a sample. During analysis, molecules from the sample are ionized to form ions. A detector produces a signal relating to the mass of the molecule and charge carried on the molecule and a mass-to-charge ratio (m/z) for each of the ions is determined.

A chromatographic separation technique may be performed prior to injecting the sample into a mass spectrometer. Chromatography is a technique for separating compounds, such as those held in solution, where the compounds will exhibit different affinity for a separation medium in contact with the solution. As the solution flows through such an immobile medium, the compounds separate from one another. Common chromatographic separation instruments include gas chromatographs (GC) and liquid chromatographs (LC). When coupled to a mass spectrometer, the resulting systems are referred to as GC/MS or LC/MS systems. GC/MS or LC/MS systems are typically on-line systems in which the output of the GC or LC is coupled directly to the MS.

In an LC/MS system, a sample is injected into the liquid chromatograph at a particular time. The liquid chromatograph causes the sample to elute over time resulting in an eluent that exits the liquid chromatograph. The eluent exiting the liquid chromatograph is continuously introduced into the ionization source of the mass spectrometer. As the separation progresses, the composition of the mass spectrum generated by the MS evolves and reflects the changing composition of the eluent.

Typically, at regularly spaced time intervals, a computer-based system samples and records the spectrum. The response (or intensity) of an ion is the height or area of the peak as may be seen in the spectrum. The spectra generated by conventional LC/MS systems may be further analyzed. Mass or mass-to-charge ratio estimates for an ion are derived through examination of a spectrum that contains the ion. Retention time estimates for an ion are derived by examination of a chromatogram that contains the ion.

Two stages of mass analysis (MS/MS also referred to as tandem mass spectrometry) may also be performed. One particular mode of MS/MS is known as product ion scanning where parent or precursor ions of a particular m/z value are selected in the first stage of mass analysis by a first mass filter/analyzer. The selected precursor ions are then passed to a collision cell where they are fragmented to produce product or fragment ions. The product or fragment ions are then mass analyzed by a second mass filter/analyzer.

SUMMARY OF THE INVENTION

In accordance with one aspect of the invention is a method of processing mass spectral data comprising: performing an experiment using a sample, said experiment including performing mass analysis using a mass spectrometer; acquiring precursor ion data and fragment ion data as a result of performing the experiment, wherein said mass spectrometer switches between a low energy mode generating primarily precursor ions and an elevated energy mode generating primarily fragment ions of the precursor ions, said switching being in accordance with a protocol that alternates application of the low energy mode and the elevated energy mode with a sufficient frequency whereby each of the low energy mode and the elevated energy mode is applied a plurality of times during a chromatographic peak width, wherein said precursor ion data is raw mass spectral data acquired when in the low energy mode and wherein said fragment ion data is raw mass spectral data acquired when in the elevated energy mode; specifying a set of selection criteria including a first mass value, a second mass value and a logical operation applied to the first mass value and the second mass value; and generating a chromatogram as a result of combining the precursor ion data and the fragment ion data in accordance with said set of selection criteria, wherein said chromatogram displays signal intensity as a function of scan time for a plurality of scan times, wherein said chromatogram includes a non-zero signal intensity at each of said plurality of scan times only if said precursor ion data and said fragment ion data meet the set of selection criteria at said each scan time, and otherwise said chromatogram including a zero signal intensity at said each scan time. The experiment may include performing any of a chromatographic separation and ion mobility spectrometry. The first mass value may identify a first mass of an ion in the precursor ion data. The second mass value may identify a second mass of an ion in the fragment ion data, and the logical operation may be a logical AND operation. The selection criteria may indicate that the chromatogram is to include a non-zero signal intensity at each of said plurality of scan times only if, for said each scan time, said precursor ion data includes a first detected ion having the first mass and said fragment ion data includes a second detected ion having the second mass. The non-zero signal intensity of the chromatogram at each of said plurality of scan times if said precursor ion data and said fragment ion data meet the set of selection criteria at said each scan time may be determined as a sum of intensities including intensities of the first detected ion in the precursor ion data and the second detected ion in the fragment ion data. The non-zero signal intensity of the chromatogram at each of said plurality of scan times if said precursor ion data and said fragment ion data meet the set of selection criteria at said each scan time may have a value based on one or more intensities of detected ions at said each scan time in the precursor ion data, the one or more intensities including an intensity of the first detected ion. The non-zero signal intensity of the chromatogram at each of said plurality of scan times if said precursor ion data and said fragment ion data meet the set of selection criteria at said each scan time may have a value based on one or more intensities of detected ions at said each scan time in the fragment ion data, the one or more intensities including an intensity of the second detected ion. The logical operation may be any of a logical AND operation, a logical OR operation, a logical exclusive-or (XOR) operation, a logical negation operation, a logical NXOR operation, a logical NOR operation, and a logical NAND operation. The mass spectrometer may be a time-of-flight mass spectrometer. The mass spectrometer may operate in a full scan mode with no mass filtering in acquiring the precursor ion data whereby the precursor ion data includes all ions detectable by mass spectrometer when operating in the low energy mode. The mass spectrometer may operate in a full scan mode with no mass filtering in acquiring the fragment ion data whereby the fragment ion data includes all ions detectable by mass spectrometer when operating in the elevated energy mode. The raw mass spectral data acquired in the elevated energy mode and the low energy mode may identify a plurality of scan times and, for each of said scan times, may identify one or more masses each of an ion detected during said each scan time and, for each of the one or more masses, may identify an intensity denoting an intensity of a detected ion having said each mass. The selection criteria may include any of an intensity ratio of precursor intensity to fragment intensity and a mass difference. The selection criteria may be applied to the precursor ion data and the fragment ion data to identify a target analyte and the first mass value and the second mass value may each identify a mass of an ion characteristic of the target analyte, wherein the chromatogram including only zero signal intensities for scan times indicates that the target analyte is not present in the sample.

In accordance with another aspect of the invention is a system comprising: an instrument that performs a chromatographic separation; a mass spectrometer that performs mass analysis; and a memory comprising code stored thereon that, when executed, performs a method comprising: performing an experiment using a sample, said experiment including performing a chromatographic separation using said instrument and performing mass analysis using a mass spectrometer, wherein during said experiment, said mass spectrometer switches between a low energy mode generating primarily precursor ions and an elevated energy mode generating primarily fragment ions of the precursor ions, said switching being in accordance with a protocol that alternates application of the low energy mode and the elevated energy mode with a sufficient frequency whereby each of the low energy mode and the elevated energy mode is applied a plurality of times during a chromatographic peak width, wherein precursor ion data is raw mass spectral data acquired when in the low energy mode and wherein fragment ion data is raw mass spectral data acquired when in the elevated energy mode; acquiring said precursor ion data and said fragment ion data that are raw mass spectral data as a result of performing the experiment; specifying a set of selection criteria including a first mass value, a second mass value and a logical operation applied to the first mass value and the second mass value; and generating a chromatogram as a result of combining the precursor ion data and the fragment ion data in accordance with said set of selection criteria, wherein said chromatogram displays signal intensity as a function of scan time for a plurality of scan times, wherein said chromatogram includes a non-zero signal intensity at each of said plurality of scan times only if said precursor ion data and said fragment ion data meet the set of selection criteria at said each scan time, and otherwise said chromatogram including a zero signal intensity at said each scan time.

In accordance with another aspect of the invention is a method of processing mass spectral data comprising: performing one or more experiments using one or more samples, said one or more experiments each performing processing including mass analysis using a mass spectrometer; acquiring one or more raw mass spectral data sets as a result of performing the one or more experiments; receiving selection criteria; filtering the one or more raw mass spectral data sets in accordance with the selection criteria; and generating a chromatogram as a result of said filtering, wherein said chromatogram displays signal intensity as a function of scan time for a plurality of scan times, wherein said chromatogram includes a non-zero signal intensity at each of said plurality of scan times only if said selection criteria at said each scan time is met and otherwise said chromatogram including a zero signal intensity at said each scan time. The selection criteria may include one or more masses and a logical operator. The one or more raw mass spectral data sets may include precursor ion data and fragment ion data. The selection criteria may include a mass difference applied to the precursor ion data and fragment ion data, said mass difference identifying a mass delta value. The method may include, for each of the plurality of scan times determining, for said each scan time, whether there is a first detected mass of the precursor ion data and a second detected mass of the fragment ion data having a difference between the first detected mass and the second detected mass equal to the mass delta value; and if it is determined for said each scan time that there is the first detected mass of the precursor ion data and the second detected mass of the fragment ion data having the difference equal to the mass delta value, displaying a non-zero signal intensity in said chromatogram at said each scan time.

In accordance with another aspect of the invention is a system comprising a mass spectrometer that performs mass analysis; and a memory comprising code stored thereon that, when executed, performs a method comprising: receiving one or more raw mass spectral data sets as a result of performing one or more experiments using one or more samples, said one or more experiments each performing processing including mass analysis using a mass spectrometer; receiving selection criteria; filtering the one or more raw mass spectral data sets in accordance with the selection criteria; generating a chromatogram as a result of said filtering, wherein said chromatogram displays signal intensity as a function of scan time for a plurality of scan times, wherein said chromatogram includes a non-zero signal intensity at each of said plurality of scan times only if said selection criteria at said each scan time is met and otherwise said chromatogram including a zero signal intensity at said each scan time. The system may also include an instrument that performs any of a chromatographic separation and ion mobility spectrometry. The one or more raw mass spectral data sets may include precursor ion data and fragment ion data. The selection criteria may include a mass difference applied to the precursor ion data and fragment ion data, said mass difference identifying a mass delta value. The method may include, each of the plurality of scan times determining, for said each scan time, whether there is a first detected mass of the precursor ion data and a second detected mass of the fragment ion data having a difference between the first detected mass and the second detected mass equal to the mass delta value; and if it is determined for said each scan time that there is the first detected mass of the precursor ion data and the second detected mass of the fragment ion data having the difference equal to the mass delta value, displaying a non-zero signal intensity in said chromatogram at said each scan time.

In accordance with another aspect of the invention is a computer readable medium comprising code stored thereon that, when executed, performs a method of processing mass spectral data comprising: acquiring precursor ion data and fragment ion data as a result of performing an experiment using a sample, said experiment including performing mass analysis using a mass spectrometer, wherein said mass spectrometer switches between a low energy mode generating primarily precursor ions and an elevated energy mode generating primarily fragment ions of the precursor ions, said switching being in accordance with a protocol that alternates application of the low energy mode and the elevated energy mode with a sufficient frequency whereby each of the low energy mode and the elevated energy mode is applied a plurality of times during a chromatographic peak width, wherein said precursor ion data is raw mass spectral data acquired when in the low energy mode and wherein said fragment ion data is raw mass spectral data acquired when in the elevated energy mode; specifying a set of selection criteria including a first mass value, a second mass value and a logical operation applied to the first mass value and the second mass value; and generating a chromatogram as a result of combining the precursor ion data and the fragment ion data in accordance with said set of selection criteria, wherein said chromatogram displays signal intensity as a function of scan time for a plurality of scan times, wherein said chromatogram includes a non-zero signal intensity at each of said plurality of scan times only if said precursor ion data and said fragment ion data meet the set of selection criteria at said each scan time, and otherwise said chromatogram including a zero signal intensity at said each scan time.

In accordance with another aspect of the invention is a computer readable medium comprising code stored thereon that, when executed, performs a method of processing mass spectral data comprising: acquiring one or more raw mass spectral data sets as a result of performing one or more experiments using one or more samples, said one or more experiments each performing processing including mass analysis using a mass spectrometer; receiving selection criteria; filtering the one or more raw mass spectral data sets in accordance with the selection criteria; and generating a chromatogram as a result of said filtering, wherein said chromatogram displays signal intensity as a function of scan time for a plurality of scan times, wherein said chromatogram includes a non-zero signal intensity at each of said plurality of scan times only if said selection criteria at said each scan time is met and otherwise said chromatogram including a zero signal intensity at said each scan time.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the techniques described herein.

DESCRIPTION

Figure 1:
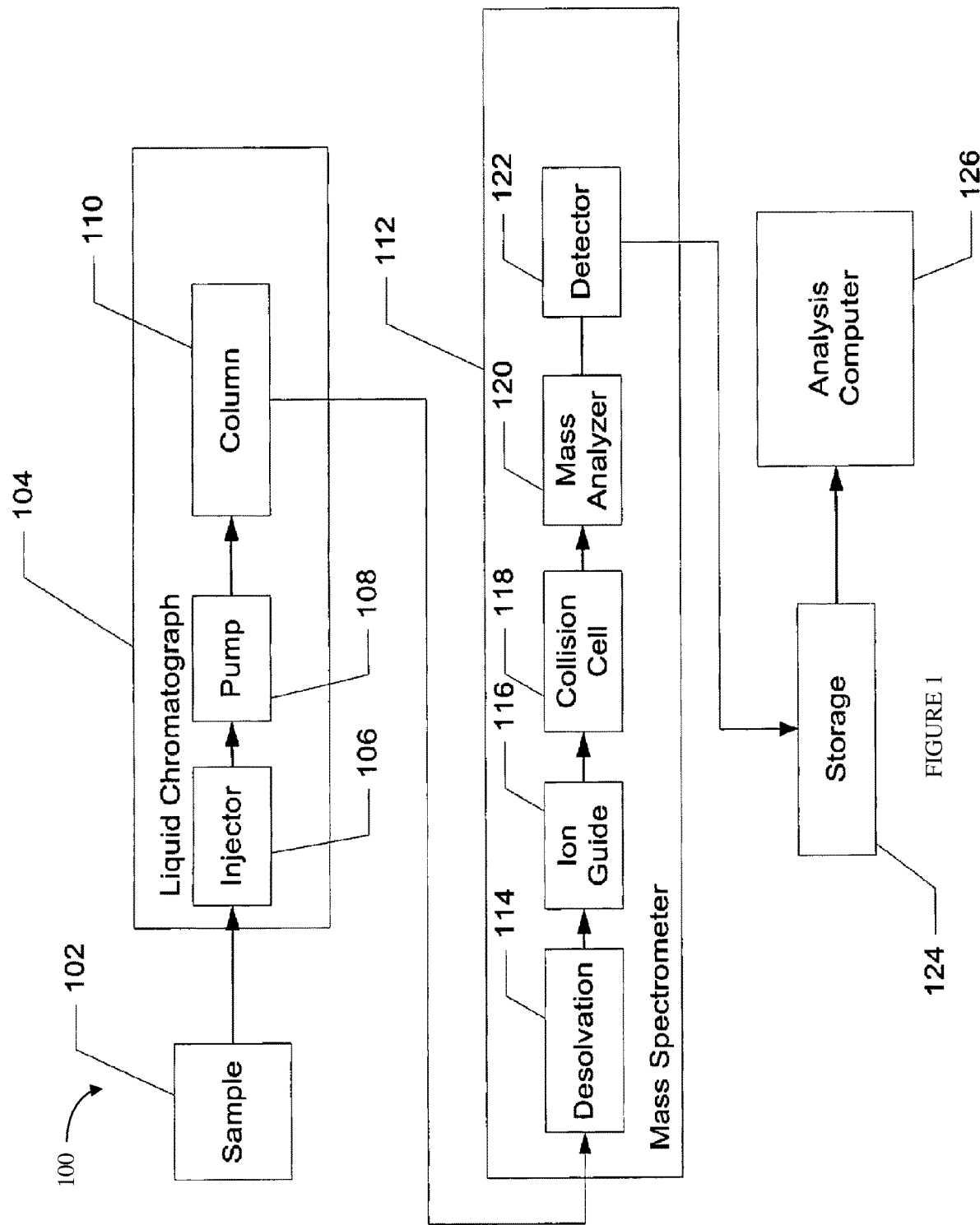
FIG. 1 is a block diagram of a system in accordance with one embodiment of the techniques herein.

As used herein, the following terms generally refer to the indicated meanings:

"Chromatography"—refers to equipment and/or methods used in the separation of chemical compounds. Chromatographic equipment typically moves fluids and/or ions under pressure and/or electrical and/or magnetic forces. The word "chromatogram," depending on context, herein refers to data or a representation of data derived by chromatographic means. A chromatogram can include a set of data points, each of which is composed of two or more values; one of these values may be a scan time or corresponding chromatographic retention time value, and the remaining value(s) are typically associated with values of intensity or magnitude, which in turn correspond to quantities or concentrations of components of a sample. In connection with techniques herein, the sample may contain one or more compounds of interest.

A sample may refer to the composition, mixture, solution, material, solid, tissue, or more generally, any substance, which is to be analyzed. In connection with techniques herein, the sample may contain one or more compounds, analytes, or components of interest. A sample or compound of interest may generally be, or include, any molecule including, for example, a small molecule, such as an organic compound, metabolite, and organic compounds, as well as a larger molecule such as a protein.

Retention time—in context, typically refers to the point in a chromatographic profile at which an entity reaches its maximum intensity.

Ions—A compound, for example, that is typically detected using the mass spectrometer (MS) appears in the form of ions in data generated as a result of performing an experiment in an LC/MS system. An ion has, for example, a retention time and an m/z value. The LC/MS system may be used to perform experiments and produce a variety of observed measurements for every detected ion. This includes: the mass-to-charge ratio (m/z), mass (m), the retention time, and the signal intensity of the ion, such as a number of ions counted.

Generally, an LC/MS system may be used to perform sample analysis and may provide an empirical description of, for example, a protein or peptide as well as a small molecule such as a pharmaceutical or herbicide in terms of its mass, charge, retention time, and total intensity. When a molecule elutes from a chromatographic column, it elutes over a specific retention time period and reaches its maximum signal at a single retention time. After ionization and (possible) fragmentation such as in connection with perform mass spectrometry, the compound appears as a related set of ions.

In an LC/MS separation, a molecule may be produced in a single or multiple charged states. MS/MS may also be referred to as tandem mass spectrometry which can be performed in combination with LC separation (e.g., denoted LC/MS/MS).

Techniques and embodiments will now be described with reference to exemplary methods and apparatus for analyzing samples such as may be for sample analyses in a system analyzing a sample by performing an LC/MS experiment. It will be appreciated that the techniques described herein may be used in connection with other embodiments and have broader application than those that may be provided and listed herein for purposes of illustration and example.

FIG. 1 is a schematic diagram of a system that may be used in connection with techniques herein. A sample 102 is injected into a liquid chromatograph 104 through an injector 106. A pump 108 pumps the sample through a column 110 to separate the mixture into component parts according to retention time through the column.

The output from the column is input to a mass spectrometer 112 for analysis. Initially, the sample is desolved and ionized by a desolvation/ionization device 114. Desolvation can be any technique for desolvation, including, for example, a heater, a gas, a heater in combination with a gas or other desolvation technique. Ionization can be by any ionization techniques, including for example, electrospray ionization (ESI), atmospheric pressure chemical ionization (APCI), matrix assisted laser desorption (MALDI) or other ionization technique. Ions resulting from the ionization are fed to a collision cell 118 by a voltage gradient being applied to an ion guide 116. Collision cell 118 can be used to pass the ions (low-energy) or to fragment the ions (high-energy).

As described in more detail elsewhere herein, different techniques including one described in U.S. Pat. No. 6,717,130, to Bateman et al. ("Bateman"), which is incorporated by reference herein, may be used in which an alternating voltage can be applied across the collision cell 118 to cause fragmentation. Spectra are collected for the precursors at low-energy (no collisions) and fragments at high-energy (results of collisions).

The output of collision cell 118 is input to a mass analyzer 120. Mass analyzer 120 can be any mass analyzer, including quadrupole, time-of-flight (TOF), ion trap, magnetic sector mass analyzers as well as combinations thereof. A detector 122 detects ions emanating from mass analyzer 122. Detector 122 can be integral with mass analyzer 120. For example, in the case of a TOF mass analyzer, detector 122 can be a microchannel plate detector that counts intensity of ions, i.e., counts numbers of ions impinging it.

A storage medium 124 may provide permanent storage for storing the ion counts for analysis. For example, storage medium 124 can be an internal or external computer data storage device such as a disk, flash-based storage, and the like. An analysis computer 126 analyzes the stored data. Data can also be analyzed in real time without requiring storage in a storage medium 124. In real time analysis, detector 122 passes data to be analyzed directly to computer 126 without first storing it to permanent storage.

Collision cell 118 performs fragmentation of the precursor ions. Fragmentation can be used to determine the primary sequence of a peptide and subsequently lead to the identity of the originating protein. Collision cell 118 includes a gas such as helium, argon, nitrogen, air, or methane. When a charged precursor interacts with gas atoms, the resulting collisions can fragment the precursor by breaking it up into resulting fragment ions. Such fragmentation can be accomplished as using techniques described in Bateman by switching the voltage in a collision cell between a low voltage state (e.g., low energy, <5 V) which obtains MS spectra of the peptide precursor, with a high voltage state (e.g., high or elevated energy, >15V) which obtains MS spectra of the collisionally induced fragments of the precursors. High and low voltage may be referred to as high and low energy, since a high or low voltage respectively is used to impart kinetic energy to an ion.

Various protocols can be used to determine when and how to switch the voltage for such an MS/MS acquisition. For example, conventional methods trigger the voltage in either a targeted or data dependent mode (data-dependent analysis, DDA). These methods also include a coupled, gas-phase isolation (or pre-selection) of the targeted precursor. The low-energy spectra are obtained and examined by the software in real-time. When a desired mass reaches a specified intensity value in the low-energy spectrum, the voltage in the collision cell is switched to the high-energy state. The high-energy spectra are then obtained for the pre-selected precursor ion. These spectra contain fragments of the precursor peptide seen at low energy. After sufficient high-energy spectra are collected, the data acquisition reverts to low-energy in a continued search for precursor masses of suitable intensities for high-energy collisional analysis.

It should be noted that different suitable methods may be used with a system as described herein to obtain ion information such as for precursor and product ions in connection with mass spectrometry for an analyzed sample. Although conventional switching techniques can be employed, embodiments may also use techniques described in Bateman which may be characterized as a fragmentation protocol in which the voltage is switched in a simple alternating cycle. This switching is done at a high enough frequency so that multiple high- and multiple low-energy spectra are contained within a single chromatographic peak. Unlike conventional switching protocols, the cycle is independent of the content of the data. Such switching techniques described in Bateman, provide for effectively simultaneous mass analysis of both precursor and product ions. In Bateman, using a high- and low-energy switching protocol may be applied as part of an LC/MS analysis of a single injection of a peptide mixture. In data acquired from the single injection or experimental run, the low-energy spectra contains ions primarily from unfragmented precursors, while the high-energy spectra contain ions primarily from fragmented precursors. For example, a portion of a precursor ion may be fragmented to form product ions, and the precursor and product ions are substantially simultaneously analyzed, either at the same time or, for example, in rapid succession through application of rapidly switching or alternating voltage to a collision cell of an MS module between a low voltage (e.g., generate primarily precursors) and a high or elevated voltage (e.g. generate primarily fragments) to regulate fragmentation. Operation of the MS in accordance with the foregoing techniques of Bateman by rapid succession of alternating between high (or elevated) and low energy may also be referred to herein as the Bateman technique and the high-low protocol.

In summary, such as when operating the system using the Bateman technique, a sample 102 is injected into the LC/MS system. The LC/MS system produces two sets of spectra, a set of low-energy spectra and a set of high-energy spectra. The set of low-energy spectra contain primarily ions associated with precursors. The set of high-energy spectra contain primarily ions associated with fragments. These spectra are stored in a storage medium 124. After data acquisition, these spectra can be extracted from the storage medium and displayed and processed by post-acquisition algorithms in the analysis computer 126.

The data acquired by the high-low protocol allows for the accurate determination of the retention times, mass-to-charge ratios, and intensities of all ions collected in both low- and high-energy modes. In general, different ions are seen in the two different modes, and the spectra acquired in each mode may then be further analyzed separately or in combination.

The ions from a common precursor as seen in one or both modes will share the same retention times (and thus have substantially the same scan times) and peak shapes. The high-low protocol allows the meaningful comparison of different characteristics of the ions within a single mode and between modes. This comparison can then be used to group ions seen in both low-energy and high-energy spectra.

Figure 2:
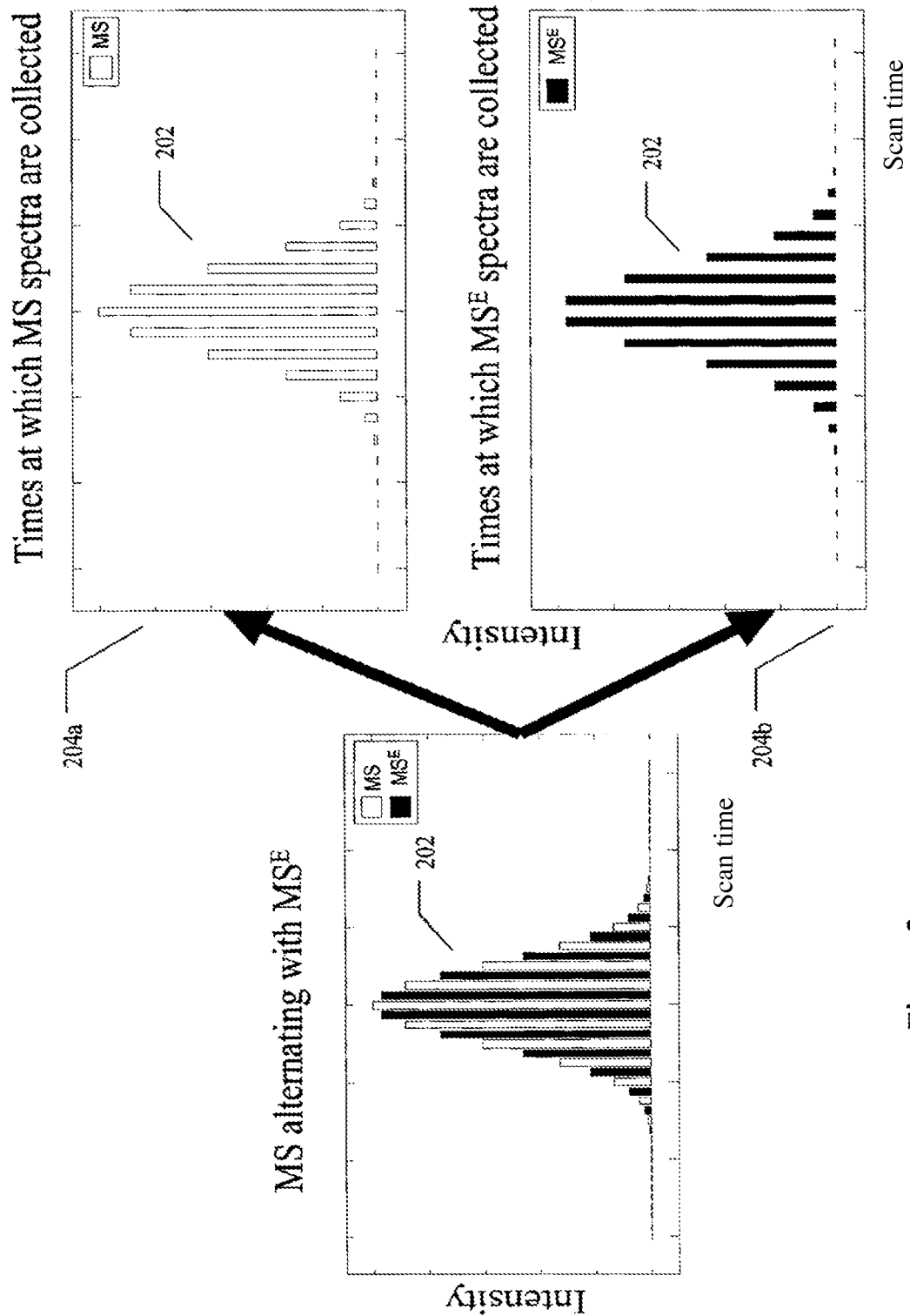
FIG. 2 shows three related graphs, which illustrate the collection of mass spectra in accordance with one embodiment of the techniques herein.

FIG. 2 illustrates the times at which spectra are obtained during the elution of a peak resulting from application of the alternating low- and high-energy modes according to an embodiment in accordance with techniques herein. FIG. 2 shows that the chromatographic profiles and scan times of ions associated with the precursors can be reconstructed for both the high- and low-energy spectral data.

Peak 202 represents the chromatographic elution profile of a single precursor. The horizontal axis is time, for example, such as the different MS scan times or corresponding retention times occurring during sample elution. The vertical axis is arbitrary, and represents the time-varying concentration, the chromatographic profile, of the precursor as it elutes from the chromatographic column.

Thus the first graph with peak 202 illustrates the alternating collection over time of low-energy spectra (i.e., spectra from unfragmented precursors, labeled "MS") and elevated-energy spectra (i.e., spectra from fragmented precursors, that is, product ions, labeled "$MS^E$".) Second and third graphs 204a, 204b, respectively, illustrate the MS and $MS^E$ spectral collection times and the reconstruction of the peak 202 associated with the precursor as may be generated using the Bateman technique. Plots 204a (low-energy) and 204b (high-energy) in FIG. 2 depict the same chromatographic peak 202, wherein the horizontal axis represents time and the vertical axis represents intensity of an ion.

An eluting molecule, passed to the mass spectrometer, produces ions in both low- and high-energy modes. The ions produced in the low-energy mode are primarily those of the precursor ions in possibly different isotopic and charge states. In high-energy mode, the ions are primarily different isotopes and charge states of the fragment ions of those precursors. High-energy mode can also be referred to as elevated-energy mode.

In the plot of peak 202, the alternating bars of different density represent the times at which spectra were collected with low and high-energy voltages during the elution of the depicted peak. The bars alternate uniformly in time. Plot 204a illustrates exemplary the times at which low-energy voltage was applied in the collision cell, resulting in low-energy spectra. Plot 204b illustrates times at which high-energy voltage was applied in the collision cell, resulting in high-energy spectra. As shown in 204a and 204b, the chromatographic peak is sampled multiple times, by the high- and low-energy modes.

A sample thus produces ions in both low- and elevated-energy modes. The ions produced in the low-energy mode are primarily those of the precursor ions in possibly different isotopic and charge states. In elevated-energy mode, the ions are primarily different isotopes and charge states of the fragment, or product, ions of those precursors. High-energy mode can also be referred to as elevated-energy mode.

Thus, when operating the MS instrument using the high-low protocol as described in Bateman, for a single experimental run or injection with a sample, analysis may result in obtaining a first set of the low energy mass spectral data represented by 204a containing primarily precursor ion data and a second set of the high or elevated energy mass spectral data represented by 204b containing primarily fragment ion data.

As described in more detail below, such data generated as a result of mass spectral analysis may include scan times.

Thus, this data may be characterized as "raw" mass spectral analysis data that has not yet been further processed to convert scan times to corresponding retention times.

In some embodiments, the system of FIG. 1 may further include components in the detector (or as a separate component or instrument) to additionally perform ion mobility spectrometry (IMS) in addition to the liquid chromatography and mass spectrometery/analysis performed. In such embodiments, further post processing of the mass spectral data may convert the resulting mass spectral data scan times of the raw mass spectral analysis data to corresponding retention times and also corresponding drift times. As described in more detail elsewhere herein, techniques herein may perform processing on the raw mass spectral analysis data.

With reference back to FIG. 1, in operation, the sample 102 is injected into the LC 104 via the injector 106. The pump 108 pumps the sample through the column 110 to separate the sample into component parts according to retention time through the column 110. A high pressure stream of chromatographic solvent provided by pump 108 and injector 106 forces sample 102 to migrate through a chromatographic column 110 in liquid chromatograph 104. Column 110 typically comprises a packed column of silica beads whose surface comprises bonded molecules. The output from the column 110 is input to MS 112 for analysis. In one embodiment, the LC 104 may be an ultra performance liquid chromatography (UPLC) system such as the ACQUITY UPLC® System from Waters Corporation of Milford, Mass.

Mass analyzers of the MS 112 can be placed in tandem in a variety of configurations, including, e.g., quadrupole time-of-flight (Q-TOF) mass analyzers. A tandem configuration enables on-line collision modification and analysis of an already mass-analyzed molecule. For example, in triple quadrupole based massed analyzers (such as Q1-Q2-Q3 or Q1-Q2-TOF mass analyzers), the second quadrupole (Q2), imports accelerating voltages to the ions separated by the first quadrupole (Q1). These ions, collide with a gas expressly introduced into Q2. The ions fragment as a result of these collisions. Those fragments are further analyzed by the third quadrupole (Q3) or by the TOF. In one embodiment, the MS 112 may be a QTOF mass spectrometer such as, for example, the SYNAPT G2™ Mass Spectrometer from Waters Corporation of Milford, Mass.

As an output, the MS 112 generates a series of spectra or scans collected over time. A mass-to-charge spectrum is intensity plotted as a function of m/z. Each element, a single mass-to-charge ratio, of a spectrum may be referred to as a channel. Viewing a single channel over time provides a chromatogram for the corresponding mass-to-charge ratio. The generated mass-to-charge spectra or scans can be acquired and recorded on a storage medium such as a hard-disk drive or other storage media represented by element 124 that is accessible to computer 126. Typically, a spectrum or chromatogram is recorded as an array of values and stored on storage 124. The spectra stored on 124 may be accessed using the computer 126 such as for display, subsequent analysis, and the like. A control means (not shown) provides control signals for the various power supplies (not shown) which respectively provide the necessary operating potentials for the components of the system 100 such as the MS 112. These control signals determine the operating parameters of the instrument. The control means is typically controlled by signals from a computer or processor, such as the computer 126.

A molecular species migrates through column 110 and emerges, or elutes, from column 110 at a characteristic time. This characteristic time commonly is referred to as the molecule's retention time. Once the molecule elutes from column 106, it can be conveyed to the MS 112. A retention time is a characteristic time. That is, a molecule that elutes from a column at retention time t in reality elutes over a period of time that is essentially centered at time t. The elution profile over the time period is referred to as a chromatographic peak. The elution profile of a chromatographic peak can be described by a bell-shaped curve. The peak's bell shape has a width that typically is described by its full width at half height, or half-maximum (FWHM). The molecule's retention time is the time of the apex of the peak's elution profile. Spectral peaks appearing in spectra generated by mass spectrometers have a similar shape and can be characterized in a similar manner.

The storage 124 may be any one or more different types of computer storage media and/or devices. As will be appreciated by those skilled in the art, the storage 124 may be any type of computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired code, data, and the like, which can accessed by a computer processor.

The computer 126 may be any commercially available or proprietary computer system, processor board, ASIC (application specific integrated circuit), or other component which includes a computer processor configured to execute code stored on a computer readable medium. The processor, when executing the code, may cause the computer system 126 to perform processing steps such as to access and analyze the data stored on storage 124. The computer system, processor board, and the like, may be more generally referred to as a computing device. The computing device may also include, or otherwise be configured to access, a computer readable medium, such as represented by 124, comprising executable code stored thereon which cause a computer processor to perform processing steps.

The system 100 may be used to perform an LC/MS experiment to analyze a sample and generate mass spectra for precursor and its product or fragment ions of at least one compound in the sample. The generated mass spectra may be further analyzed and/or processed for use in connection with any of a variety of techniques for different applications. In connection with the techniques herein, the mass spectra data may be examined to determine a precursor and its associated product ions. Once the precursor and its associated product ions have been determined, such information may be used to identify a particular compound of interest.

Any suitable method using the system 100 may be used to obtain both precursor and product ions from a sample injection. Some methods, such as operating the MS instrument in accordance with the high-low protocol as described in Bateman, provide effectively simultaneous mass analysis of both precursor and product ions. For example, a portion of an eluted precursor is fragmented to form product ions, and the precursor and product ions are substantially simultaneously analyzed, either at the same time or, for example, in rapid succession. Thus, an embodiment may use the technique described in Bateman or other suitable technique to operate the MS instrument and to also use retention-time observations to support the determination of which product ion(s) are derived from a particular precursor. The product ions are associated with their precursor ion in response to matching retention-time values.

Analysis of the mass spectra permits measurement of an accurate retention time value for both the eluted precursor and its associated product(s) or fragment(s). Moreover, for example, peak shape, width, and/or retention time of the peaks associated with precursor ions and with product ions may be compared to determine which product ions are associated with a particular precursor ion. The product ions are associated with their precursor ion in response to matching retention-time values (e.g., such as associated with the peaks of such ions) and/or other characteristics such as chromatographic peak profile or shape as described elsewhere herein. Furthermore and more generally, ions (precursors and fragments) derived from a common originating molecule may have a common retention time and/or other similar characteristics.

For example, a threshold retention-time difference is selected. If the difference in retention times of a product ion and a precursor ion is less than the threshold value, the product is determined to be derived from the precursor. For example, one suitable threshold value is equal to one tenth the retention-time peak width of the precursor ion. The retention-time value of an ion is optionally defined as the time value of the peak maximum of the peak that was observed for that ion.

In an LC/MS experiment as mentioned above, an ion can be described and/or referred to by its retention time, mass-to-charge ratio or mass, charge state, and intensity. An originating molecule can give rise to multiple ions derived from the originating molecule where each such ion is either a precursor or a fragment. These fragments arise from processes that break up the originating molecule. These processes can occur in the ionization source or in a collision cell of the MS 112. Because fragment ions derive from a common eluting, originating molecule, they must have the same chromatographic retention time and peak profile as the originating molecule. The retention time and peak shapes of ions that derive from a common originating molecule are the same because the time of ion formation, fragmentation, and ion detection is generally much shorter than the peak width of the originating molecule. For example, a typical chromatographic peak width, measured at full-width at half-maximum (FWHM) is 5 to 30 seconds. The time of ion formation, fragmentation, and detection is typically sub milliseconds. Thus on a chromatographic time scale, the time of ion formation is an instantaneous process. It follows that differences in observed retention times of the ions that derived from an originating molecule is effectively zero. That is, sub-millisecond retention time differences between ions that derived from an originating molecule are small compared to the chromatographic peak width.

With respect to ions that are generated from collision-induced disassociation of intact precursor ions, the fragment or product ions are associated with their parent precursor ion. By using the mass spectrometer in a high-low data acquisition mode (also referred to herein as an elevated-low-data acquisition mode) as described in the Bateman '130 patent, this association is accomplished without requiring the instrument to pre-select a single precursor for subsequent fragmentation. More specifically, associated ions are appropriately grouped when multiple precursors are fragmenting simultaneously, at essentially the same retention time.

The retention time and chromatographic peak profile of a molecule eluting from a chromatographic support matrix, such as column 110, is a function of the physical interaction of that molecule between the support matrix and mobile phase. The degree of interaction that a molecule has between the support matrix and the mobile phase dictates the chromatographic profile and retention time for that molecule. In a complex mixture, each molecule is chemically different. As a result, each molecule can have a different affinity for the chromatographic matrix and the mobile phase. Consequently, each can exhibit a unique chromatographic profile.

Generally, a chromatographic profile for a specific molecule is unique and describes the physicochemical properties of that molecule. Parameters optionally used to characterize the chromatographic peak profile of a given molecule include the time of initial detection (liftoff), normalized slope, the time of inflection points relative to the time of the peak apex, the time of maximum response (peak apex), the peak width, at inflection points, at full-width-at-half-maximum (FWHM), peak shape asymmetry, and the time of the final detection (touch down) to name only a few.

As known in the art and as also described herein, a mass spectrometer may operate in accordance with a variety of different data acquisition modes. One mode is multiple reaction monitoring (MRM) in which two stages of mass filtering are employed on a triple quadrupole mass spectrometer. An ion of interest (the precursor) is preselected through a first mass filtering stage using quadrupole Q1 and induced to fragment by collisional excitation with a neutral gas in a pressurized collision cell of the second quadrupole Q2. Rather than obtaining full scan MS/MS analysis where all the possible fragment ions derived from the precursor are mass analyzed, the third quadrupole Q3 provides a second stage of mass filtering that mass analyzed only a small number of sequence-specific fragment ions (transition ions). This targeted MS analysis using MRM enhances the lower detection limit for peptides by up to 100 fold (as compared to full scan MS/MS analysis) by allowing rapid and continuous monitoring of the specific ions of interest. In this manner, when the triple quadrupole MS instrument operates in MRM mode, the hardware of the MS instrument may be used to perform selective ion filtering.

However, in order to analyze the same sample to look for different ions of interest such as through using MRM mode for filtering and selection of particular ions of interest, another experimental run is performed. As an alternative to relying on the MS hardware to perform such filtering and selection of ions of interest, techniques described in following paragraphs may be used to selectively filter acquired raw MS data. Such processing may be performed by execution of code on a processor that processes the raw mass spectral data. In connection with at least one embodiment using techniques described herein that operate on the raw mass spectral data, the MS data may be acquired, for example, when operating the mass spectrometer in full scan mode with no filtering for one or more of high energy mode and low energy mode. The mass spectrometer may be, for example, a TOF MS instrument that operates in accordance with the high-low protocol described in Bateman and obtains a full scan of both high and low energy mode data with no filtering (e.g., whereby the low energy scan data consisting primarily of data for precursors may be in a first data set and the high energy scan data consisting primarily of data for the fragments of such precursors may be in a second different data set). In this manner, the techniques described in following paragraphs may be used to enter selection criteria identifying one or more ions of interest in one or more of the low energy scan data set and the high energy scan data set whereby a resulting chromatogram only includes a non-zero intensity for each scan time if the selection criteria is met or true. For example, the selection criteria may specify a first ion having a first mass for the low energy scan data and a second ion having a second mass for the high energy scan data. The selection criteria may indicate that the first ion should be in the low energy scan data and the second ion should be in the high energy scan data for the same scan or same scan time. A resulting chromatogram may be displayed in which, for each particular scan time, the resulting chromatogram will display a point having a non-zero intensity only if the selection criteria evaluates to true for that particular scan time. In this example, the resulting chromatogram only displays such a point for a first scan with a non-zero intensity if the first ion is included in the low energy scan data for the first scan and also the second ion is included in the high energy scan data for the first scan. The foregoing may be performed by software that processes the raw MS data and then generates a resulting chromatogram based on the selection criteria.

At a second different point in time, the same raw MS data (e.g., high and low energy raw MS data sets acquired through operating the TOF MS instrument in accordance with the high-low protocol of Bateman) may be processed using a second different set of selection criteria, for example, to look for different ions in the low energy scan data and/or high energy scan data. For example, the raw MS data may be acquired for a first analyzed sample and it may be desired to see if the sample includes a first compound of interest. The first selection criteria at a first point in time may identify a first precursor and associated first fragment ions characteristic of the first compound of interest whereby the resulting chromatogram may only include points having non-zero intensity if the first precursor and associated first fragment ions characteristic are both present in the same scan. In this manner, if the resulting chromatogram does not include any data points (or no data points at a about a particular scan time corresponding to an expected approximate retention time of a particular target analyte of the compound, it may be concluded that the first compound of interest is not present. At a second point in time, second selection criteria may be used to identify a second precursor and associated second fragment ions characteristic of a second compound of interest whereby the resulting chromatogram may only include points having non-zero intensity if the second precursor and associated second fragment ions characteristic are both present in the same scan time. If the resulting chromatogram does not include any data points, it may be concluded that the second compound of interest is not present. In this manner, the software may be executed to perform the filtering of the multiple sets of raw MS data rather than have the MS hardware perform the ion selection and filtering such as with the MRM mode of data acquisition noted above. Using such techniques, a single injection or experimental run of scan data may be obtained and processed multiple times rather than performing multiple experiments for the same sample where the MS hardware performs the desired filtering and ion selection.

As described in more detail below, more generally, techniques herein may be used in connection with processing one or more raw MS data sets obtained from the same or different experiments. The raw MS data sets may be obtained by operating the MS instrument in accordance with the high-low protocol described in Bateman or any other suitable manner.

It should be noted that the techniques herein may also be more generally applied for use with selection criteria to more than two raw MS data sets as well as only a single raw MS data set. Such data sets may be acquired through operation of the MS instrument using the high-low protocol as described in Bateman or any suitable manner. Such data sets may be from the same or different experimental runs or injections performed on the same or different samples.

In at least one other embodiment using techniques herein that operate on raw mass spectral data, a first raw MS data set may be acquired for a first analysis of a sample using a triple quadrupole MS instrument using a first stage of mass filtering to select one or more precursor masses of interest and then having no filtering in the second filtering stage (e.g., low energy full scan data). In this case, the first raw MS data set may include data for both the high and low energy scans (e.g., both precursors and fragments). Techniques herein may be used to obtain selection criteria and perform processing of the single first raw MS data set in a manner similar to that as described herein for two or more sets.

Additionally, a second raw MS data set may be acquired for a second analysis of a second sample using a triple quadrupole MS instrument using a first stage of mass filtering to select one or more precursor masses of interest and then having no filtering in the second filtering stage (e.g., low energy full scan data). Techniques herein may be used to obtain selection criteria and perform processing of both the first and the second raw MS data sets as described herein connection with other examples operating on multiple data sets. The foregoing and other examples are described in more detail in following paragraphs.

Figure 3:
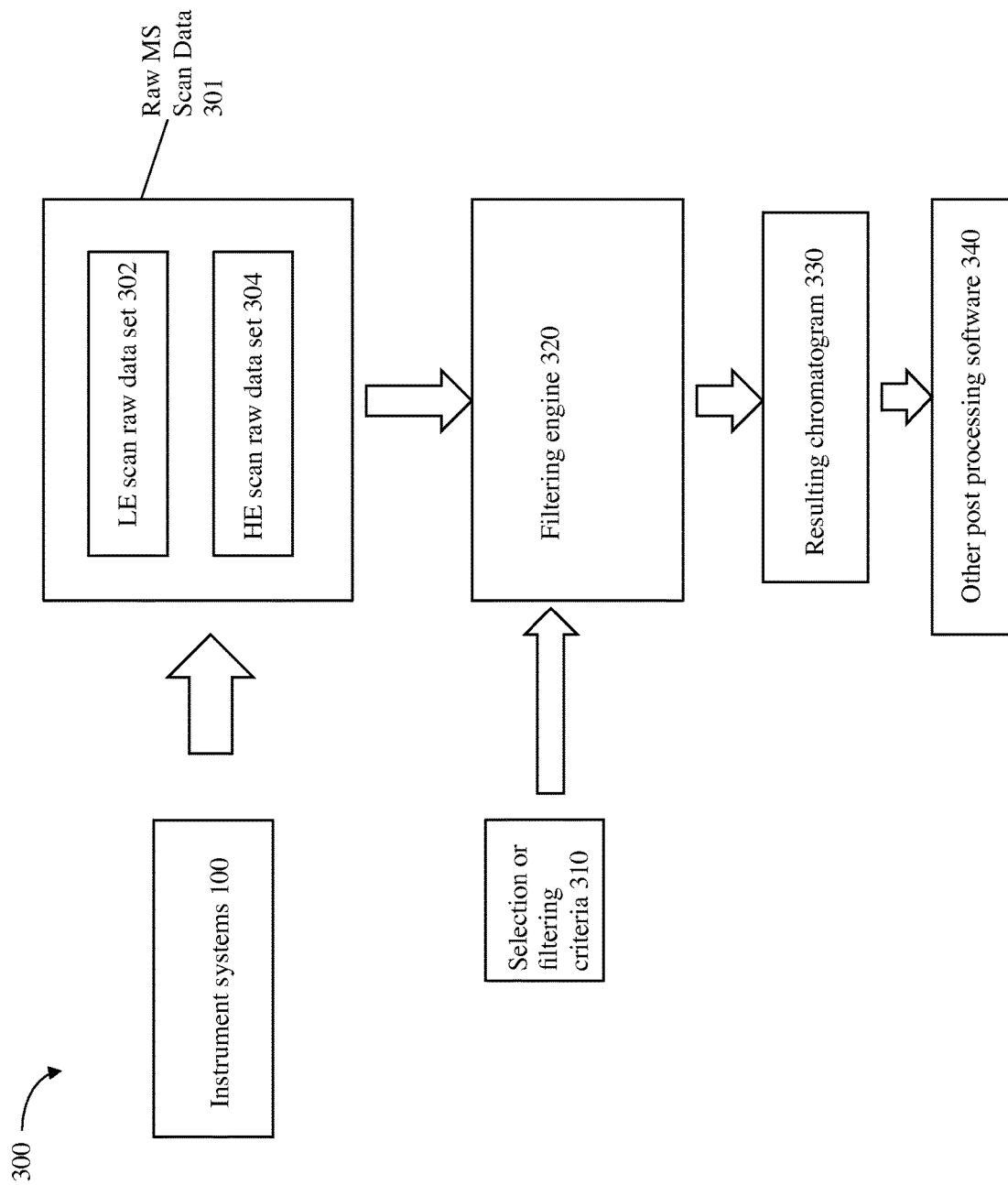
FIG. 3 is an example of components and data that may be used in an embodiment in accordance with techniques herein.

Referring to FIG. 3, shown is an example illustrating components that may be used in an embodiment in accordance with techniques herein. The example 300 includes instrument systems 100 denoting the instruments, such as the LC and MS instruments, performing sample analysis such as illustrated in the system 100 of FIG. 1. In this example, an experiment may be performed to analyze a sample where the MS may operate in accordance with the high-low protocol of Bateman to generate the raw MS scan data 301 for a single sample analysis. As noted above and elsewhere herein, the raw MS scan data 301 for the single experimental run or injection may include two data sets— the low energy (LE) scan raw data set 302 and the high energy (HE) scan raw data set 304. Element 302 may denote the raw MS scan data acquired when operating the MS instrument in low energy mode and element 304 may denote the raw MS scan data acquired when operating the MS instrument in high energy mode. In this example, the data sets 302 and 304 may include full scan data for all detected ions with no mass filtering.

The raw MS scan data 301 may be provided as a first input to the filtering engine 310. Additionally, the filtering engine 310 is provided with selection or filtering criteria 310. The filtering engine 320 may be embodied as one or more software modules that process the raw MS scan data 301 whereby such processing includes performing the ion selection or filtering as described herein in accordance with the selection criteria 310 to combine or associate the data sets 302, 304 and generate one or more resulting chromatograms 330. Such filtering may be characterized as generating a resulting chromatogram by associating or combining the two raw data sets in accordance with the selection or filtering criteria.

Subsequently, the one or more resulting chromatograms 330 may be optionally further processed such as using other post processing software 340. Such post processing software 340 may generally include any suitable and desired post processing such as may be typically performed on raw MS scan data 301, for example, for peak detection, mapping or translating raw scans/scan times to corresponding retention times and/or drift times, and the like. Additional details and examples regarding the elements of FIG. 3 are described in more detail elsewhere herein.

It should be noted that in an experiment such as described in FIG. 3 where two raw MS data sets are acquired in a single run or acquisition with the MS instrument operating in accordance with the high-low protocol, techniques herein may provide an additional advantage of reduced noise in the resulting chromatogram generated by applying the filtering or selection criteria to combine the multiple raw MS data sets. An example of this is further illustrated such as in connection with FIGS. 6-13 elsewhere herein.

Figure 4:
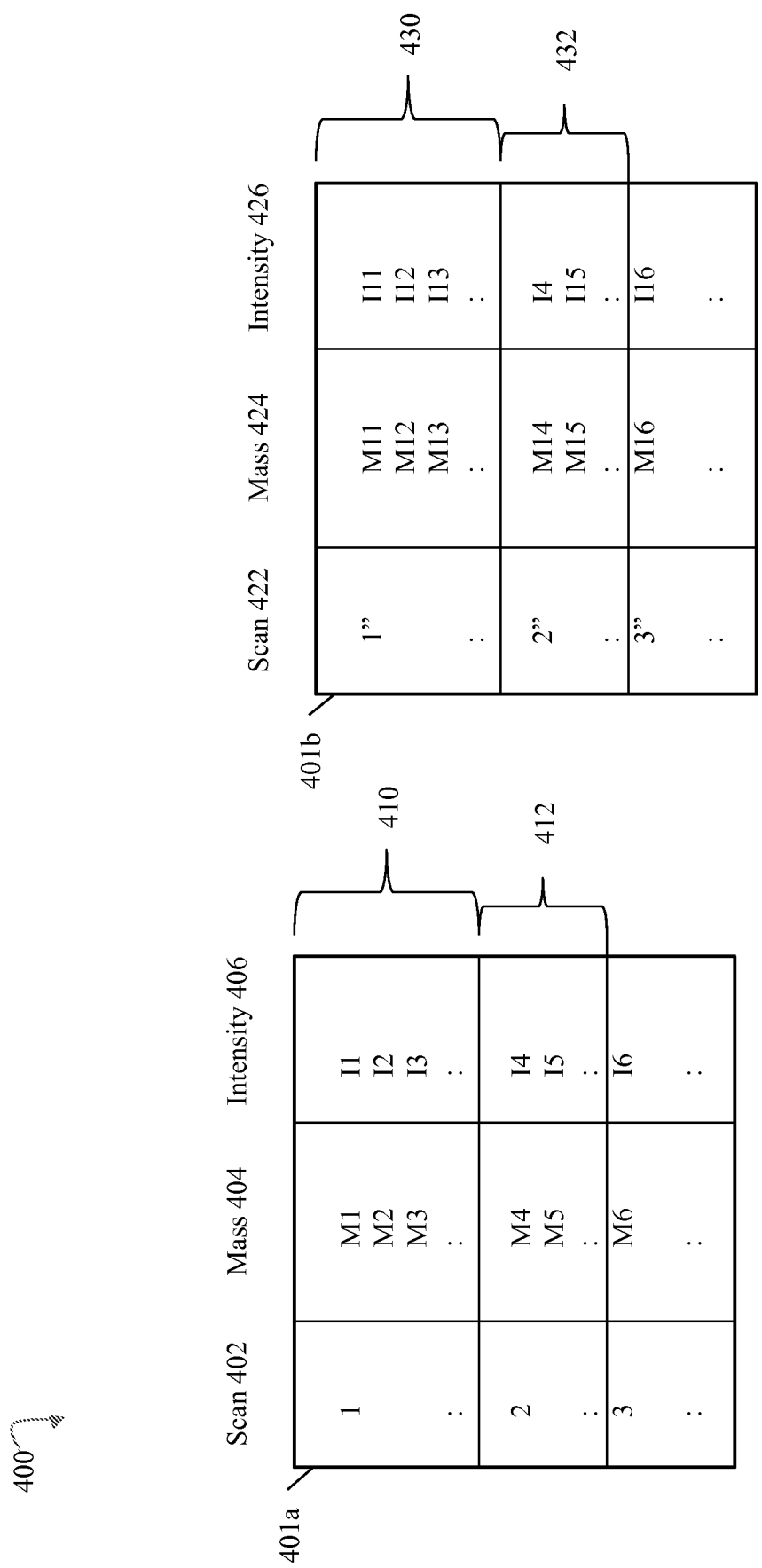
FIGS. 4 and 5 are examples of raw MS scan data that may be used in an embodiment in accordance with techniques herein.

Referring to FIG. 4, shown is an example of information that may be included in the raw mass spectral data that is processed in an embodiment in accordance with techniques herein. The example 300 illustrates information that may be included in the raw MS scan data 301. Element 401a may represent the raw precursor ion spectral data, (denoted as the LE scan raw data set 302 in FIG. 3) obtained as a result of performing an experiment described above in connection with FIG. 3 when operating the MS instrument in accordance with the high-low protocol of Bateman. Element 401b may represent the raw product or fragment ion spectral data obtained as a result of performing an experiment described above in connection with FIG. 3 when operating the MS instrument in accordance with the high-low protocol of Bateman. In particular, in an embodiment utilizing an MS instrument operating in accordance with the high-low protocol of Bateman, data of 401a and 401b may be acquired in a single experiment or run whereby alternating scans are associated with precursor and product ion spectra. In the example 400, scan I of table 401a and a corresponding scan I" of table 401b represent data acquired for substantially the same $I^{th}$ scan time and thus represent corresponding scans, where I represents a scan number that is an integer greater than 0 in this example. For a corresponding scan number I, information of table 401a is denoted by I in the scan number column 402 and information of table 401b for the same scan number is denoted by I" in the scan number column 422 pair. In the example 300, a pair of corresponding scans, I and I" have substantially the same scan time, where scan I of the pair has data in the table 401a or low energy scan data, and scan I" of the same pair has data in the table 401b or high energy scan data).

As illustrated by tables 401a and 401b, each of the data sets 401a, 401b may include information for multiple scan times for the different mass spectral scans. For each scan, a list of one or more detected masses and associated intensities may be obtained by performing mass spectrometry. For example with reference to the table 401a, column 402 represents the list of the scans, column 404 represents the detected masses at the scan, and column 406 represents the intensities of the detected masses in column 304. For scan 1, the rows of the table 401a denoted by cell or entry 410 list the masses and associated intensities detected. For scan 2, the rows of the table 401a denoted by the cell or entry 412 list the masses and associated intensities detected. Each row of the table 401a includes a mass and an intensity denoting the intensity of the detected mass in that row. For example, i1 is the intensity of mass m1 detected as scan time 1, and i2 is the intensity of mass m2 detected at scan time 1. Table 401b may include information similar to that as described in connection with table 401b but for alternating corresponding scans associated with fragment ion data. With reference to the example 300, 410 and 430 denote corresponding low and high energy scan data for corresponding scans 1 and 1", 412 and 432 denote corresponding low and high energy scan data for corresponding scans 2 and 2".

Figure 5:
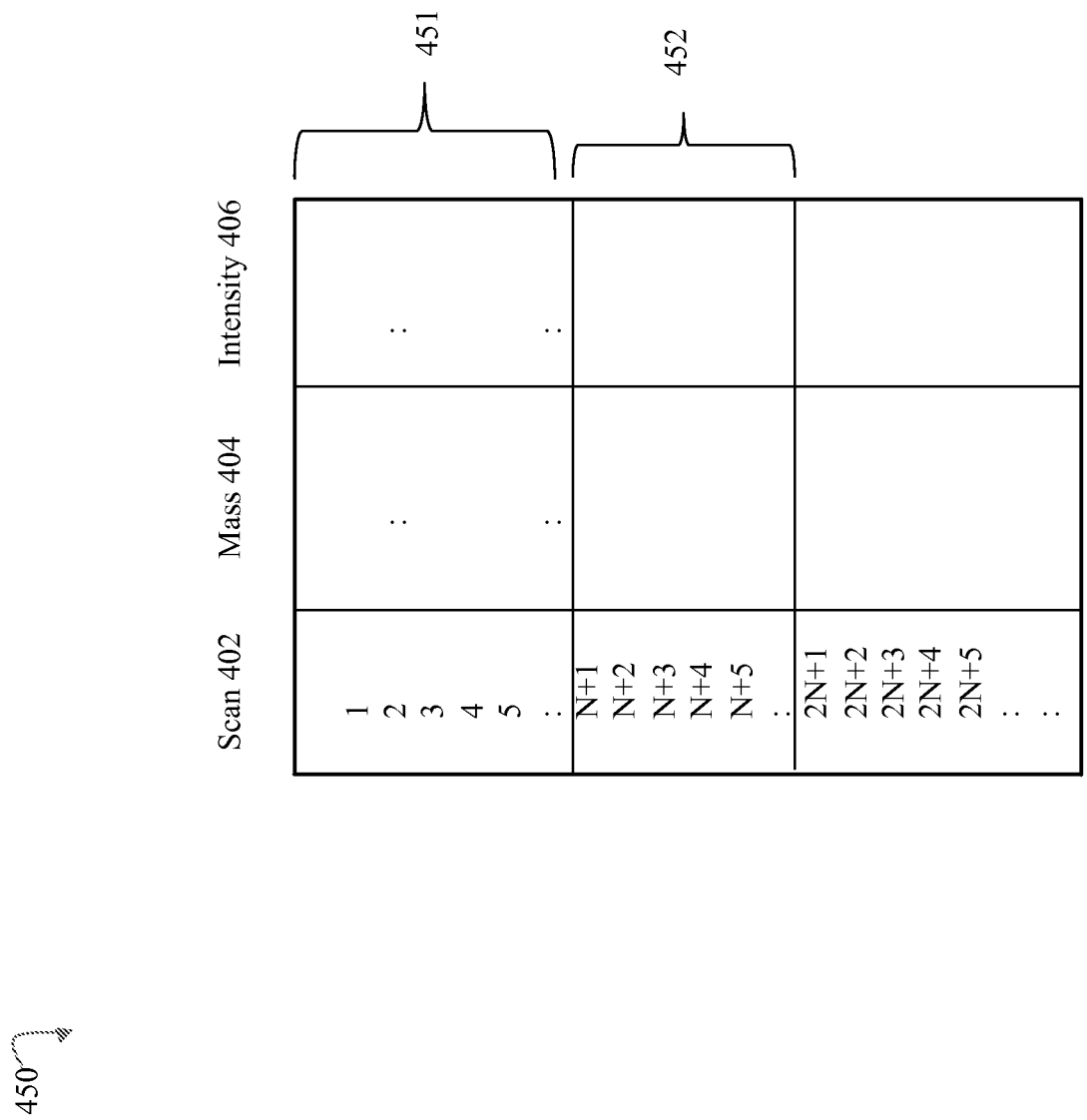

It should be noted that a pair of corresponding scans (one from table 401a and a second from table 401b) having substantially the same scan time may denote a retention time or drift time depending on the particular experiment. For example, if the separation processing performed prior to mass spectrometry includes chromatographic separation, such as for LC or GC, without ion mobility spectrometry, the scan times denote retention time. If the separation processing performed prior to mass spectrometry includes ion mobility spectrometry but no chromatographic separation, the scan times denote drift times. If both chromatography and ion mobility spectrometry are performed prior to mass spectrometry, a scan time may denote either a retention time or a drift time. For example, with LC/IMS/MS, a set of consecutive scan times may form a scan group representing a group of multiple drift times associated with a single retention time whereby a scan group (of the scan times corresponding to drift times) may be characterized as nested within or between two scan times corresponding to chromatographic retention times. For example, with reference to FIG. 5, shown is an example of scan groups 451 and 452 each including N scans. In an LC/IMS/MS experiment, each scan group 451, 452 may be associated with a different retention time. Within a single scan group, such as 451, each individual scan time may correspond to a different drift time.

It should be noted that the mass spectral data may have alternative forms than as described herein for illustration. The precursor and product ion mass spectral data operated upon using techniques herein and such as illustrated in FIGS. 4 and 5 may be characterized in one aspect as raw mass spectral data in that it has not yet been post processed by other software, such as software represented by 340 of FIG. 3, which performs peak detection, maps or translates raw scans and scan times to corresponding retention times and/or drift times, software which performs retention time alignment and associates precursor and fragment or product ions as originating from a same originating molecule based on common retention times of such ions, and the like. Such functionality that may be performed by the post processing software is described, for example, in WO 2006/133191, Methods and Apparatus for Performing Retention-Time Matching, Gorenstein et al., (the '191 patent application), which is incorporated by reference herein. Mass spectra obtained such as using LC/MS may be processed to detect peaks denoting detected ions such as described in WO2007/140327, ION DETECTION AND PARAMETER ESTIMATION FOR N-DIMENSIONAL DATA, Gorenstein et al., ("the '327 patent application"), which is incorporated by reference herein, and as described in WO2005/079263, APPARATUS AND METHOD FOR IDENTIFYING PEAKS IN LIQUID CHROMATOGRAPHY/MASS SPECTROMETRY DATA AND FOR FORMING SPECTRA AND CHROMATOGRAMS, Gorenstein et al., (the '263 patent application), which is incorporated by reference herein.

Following paragraphs set forth some examples illustrating various selection or filtering criteria that may be specified in an embodiment in accordance with techniques herein. Such examples may use a particular syntax, format, and the like to illustrate and represent items that may be specified using the criteria for processing the raw MS data sets. However, more generally, an embodiment may use any suitable syntax, format, user interface, and the like, to obtain the criteria. For example, an embodiment may allow the user to specify selection or filtering criteria through a user interface such as through menu selections in a graphical user interface, entering information through input fields such as by typing a complete command line in accordance with specified syntax, and the like.

In one embodiment, the selection or filtering criteria may be represented using the following format and syntax:

(M1 "Intensity descriptor1" "Data set descriptor1")
 LOGICAL
(M2 "Intensity descriptor2" "Data set descriptor2")

where

M1 and M2 denote mass values expressed in any suitable unit, such as Daltons;

Intensity descriptor1 is associated with mass M1 and identifies an intensity threshold condition for the mass M1;

Intensity descriptor2 is associated with mass M2 and identifies an intensity threshold condition for the mass M2;

Data set descriptor1 identifies one or more data sets, such as one or both of the precursor ion data and fragment ion mass spectral data sets obtained using the alternating scan mode as described herein. (Data set descriptor 1 is associated with mass M1 and Intensity descriptor1);

Data set descriptor2 identifies one or more data sets, such as one or both of the precursor ion data and fragment ion mass spectral data sets obtained using the alternating scan mode as described herein. (Data set descriptor 2 is associated with mass M2 and Intensity descriptor2); and LOGICAL denotes a supported binary logical operation, such as OR, XOR (exclusive OR), AND, applied to (M1 "Intensity descriptor1" "Data set descriptor1") and (M2 "Intensity descriptor2" "Data set descriptor2"). Other supported logical operators may include NOT, NOR, NAND and XNOR.

In connection with the format provided above, (M1 "Intensity descriptor1" "Data set descriptor1") may correspond to a first condition and (M2 "Intensity descriptor2" "Data set descriptor2") may correspond to a second condition and the logical operator LOGICAL may be applied to both the first and second conditions. Each of the masses, such as M1 and M2, in the selection criteria may also be referred to as mass filtering criteria or mass selection criteria. In a similar manner, each of the intensity descriptors, such as intensity descriptor 1 and 2 in the selection criteria, may also be referred to as intensity filtering criteria or intensity selection criteria.

As an example, each of intensity descriptor 1 and 2 may be implicitly specified by default as "detectable" or greater than 0 (e.g., Intensity>0) thereby denoting any level of intensity detectable by the mass spectrometer. Specifying selection criteria of "M1 detectable" or "M1 intensity>0" may denote criteria of mass=M1 whereby an ion is detected at mass M1 in a scan.

An embodiment may allow an intensity descriptor to be specified denoting "undetectable" or, for example, may allow specifying an intensity threshold minimum. Specifying selection criteria of "M1 undetectable" or "M1 intensity=0" may denote criteria of mass=M1 whereby an ion having mass M1 is not detected (e.g., has zero intensity) in a scan. Specifying selection criteria of "M1 Intensity>MIN" may denote criteria of mass=M1 whereby an ion at mass M1 is to have a minimum intensity value or count of MIN (e.g., MIN may be an integer value denoting that mass M1 is to have an intensity greater than or equal to MIN) for the criteria to evaluate to true.

An embodiment may utilize a tolerance with one or more values specified in the criteria so that the values specified may be approximate. For example, a mass value specified for M1 may be applied using a range or window such as M1+/−some mass tolerance is considered a match for the specified mass value for M1. Specifying M1=400 may result in a match for a mass in a scan which is within some threshold amount (above or below) of 400. To further illustrate, a mass value of 400.1 in a scan may be considered a match for the mass value of 400 since the mass tolerance may be +/−0.3 so that any mass within the inclusive range 399.7 to 400.3 may be considered a match for mass 400.

It should be noted that the criteria and syntax and format provided herein in examples is merely illustrative and the particular parameters and functionality may be specified in an embodiment in any suitable manner. For example, the criteria may be included in a command line syntax, specified via user interface menu options and selections, and the like, as may be supported in an embodiment.

A first example of selection or filtering criteria may be:

Example 1

(M1=400 detectable precursor) AND (M2=150 detectable fragment)

where the resulting chromatogram only displays a signal for a particular scan time when the precursor ion mass spectral data set has a detectable mass of 400 at the particular scan time and also the fragment ion mass spectral data set has a detectable mass of 150 at substantially the same particular scan time. If the foregoing criteria is met or true for the scan time, the resulting chromatogram includes a non-zero intensity signal for the scan time. In one embodiment, for each scan time meeting the criteria, the signal for the scan time in the resulting chromatogram may have an intensity that is the sum of a first intensity corresponding to the detected ion with mass=400 in the precursor ion data set and a second intensity corresponding to the detected ion with mass=150 in the fragment ion data set. Otherwise, if either ion are not detected for both of the foregoing two masses at the same scan time in the particular data sets, no signal (e.g. intensity zero) is included for that scan time in the resulting chromatogram.

As a variation to the foregoing, for the scan time meeting the criteria, the signal for the scan time in the resulting chromatogram may have an intensity that is the sum of all precursor and product ions at the scan time whereby the sum intensity may include ions having the masses 400 or 150 as well as possibly other ions which were detected at the same scan time by the mass spectrometer but not specified in the criteria (e.g., intensities as in a total ion chromatogram (TIC)). Otherwise, if either of the foregoing two masses is not found in the same scan time in the particular data sets, no signal is included for that scan time in the resulting chromatogram.

More generally, in connection with this example and others herein, an embodiment may provide one or more ways in which the intensity of a signal at a scan time meeting specified selection or filtering criteria is determined. An embodiment may support multiple ways in which the intensities in the resulting chromatogram of such scan times meeting the criteria are determined. In such an embodiment, a user may be allowed to select one of the supported ways in which the intensities are determined for the resulting chromatogram. Described above are two ways in which the intensity of a resulting signal in a chromatogram may be determined. A first way in which the intensity of a resulting signal in a chromatogram may be determined is the sum of intensities of ions specified in the criteria that are detected at the scan time. As a second way, the intensity of the resulting signal in the chromatogram may generally be the sum of all ions detected in all input data sets (e.g., both high and low energy scan data sets) at that scan time (e.g. thereby representing an ion intensity associated with a TIC or total ion count for that scan). As a third way, the intensity of a resulting signal in a chromatogram may be the sum of all detected precursors (e.g., all detected ions in the low energy scan data) at that scan time). As a fourth way, the intensity of a resulting signal in a chromatogram may be the sum of all detected fragment ions (e.g., all detected ions in the high energy scan data set at that scan time). An embodiment may also support other ways in which the intensity of signals in the resulting chromatogram are determined for scan times meeting the specified criteria. Following examples may refer to one or more particular ways in which the intensities in the resulting chromatogram may be determined but it will be appreciated by those skilled in the art that the intensities in the resulting chromatogram may be determined using other techniques some of which are described herein.

Another second example of filtering or selection criteria may be:

Example 2

(M1=400 detectable precursor) AND (M2=150 undetectable fragment)

where the resulting chromatogram only displays a signal for a scan time where the precursor ion mass spectral data set has a detectable mass of 400 and also the fragment ion mass spectral data set does not include a detectable mass of 150 for the same scan time. The foregoing may be used to denote filtering criteria where, for the same scan time, a precursor ion has a mass of 400 and no fragments are detected having a mass of 150. If such a scan time occurs whereby the precursor ion data has detected an ion with mass 400 and no fragment ion having a mass of 150 is detected, the resulting chromatogram may display a resulting signal having an intensity equal to that of the precursor ion with mass=400 in the precursor ion data set. Otherwise, no signal is included for that scan in the resulting chromatogram.

As a further variation to the foregoing, an embodiment may support additional logical operations and associated conditions. As noted above, (M1 "Intensity descriptor1" "Data set descriptor1") may correspond to a first condition and (M2 "Intensity descriptor2" "Data set descriptor2") may correspond to a second condition and the logical operator LOGICAL may be applied to both the first and second conditions. The foregoing may be further optionally expanded in an embodiment to support any suitable number of additional conditions joined by logical operators. For example, criteria may be specified which displays a resulting chromatogram for scans having a detectable specified precursor ion mass and also 2 or more detectable specified fragment ion masses. This is illustrated by the following third example of filtering or selection criteria:

Example 3

(M1=400 detectable precursor) AND (M2=150 detectable fragment) and (M3=60 detectable fragment)

where the resulting chromatogram only displays a signal for a particular scan time where the precursor ion mass spectral data set has a detectable mass of 400 and also the fragment ion mass spectral data set has detectable masses of 150 and 60 for the same particular scan time. If the scan time meets the foregoing criteria, the resulting chromatogram may include a signal at that scan time having an intensity that is the sum of a first intensity corresponding to the ion with mass=400 in the precursor ion data set, a second intensity corresponding to the ion with mass=150 in the fragment ion data set and a third intensity corresponding to the ion with mass=60 in the fragment ion data set. Otherwise, if the foregoing criteria is not met, no signal is included for that scan time in the resulting chromatogram. It should be noted that the foregoing criteria may not be met if any one or more of the specified masses is not detected (has no detectable intensity) in the designated data set. A known compound or protein may have the foregoing precursor mass=400 and two fragments at masses 150 and 60 and may be identified as included in the analyzed sample if the above-mentioned criteria is met for different scan times. In this manner, the resulting chromatogram will include a signal with a non-zero intensity for each scan time meeting the criteria thereby denoting that the precursor and fragment ions of the compound have been detected in the scan time and may be used to identify the presence of the known compound or protein. If no scan time meets the criteria, the resulting chromatogram will not contain any displayed signals thereby denoting that the known compound or protein is not present in the analyzed sample.

It should be noted that an embodiment may determine the intensity of a signal for a scan time meeting the specified selection or filtering criteria in other ways. For example, the intensity of the signal in the resulting chromatogram may be equal to the sum of the intensities of all the ions specified in the selection or filtering criteria (as described above with Examples 1-3), one of the ions specified in the selection or filtering criteria (such as only the precursor), some other sum that is less than all the intensities of all ions specified in the selection or filtering criteria, the sum of intensities of all ions in the scan time meeting the criteria (where all the ions include those specified in the criteria and also any other detected ions in the scan across both precursor and fragment ion mass spectral data). For example, consider EXAMPLE 3. If the criteria specified is met at a scan time thereby denoting that the precursor and two fragments have been detected at that scan time, the signal intensity in the resulting chromatogram may be the precursor intensity thereby omitting the fragment intensities. As a fourth example, consider the following filtering or selection criteria:

Example 4

(M1=400 detectable precursor) AND (M2=300 detectable precursor) and (M3=60 detectable fragment) AND (M4=30 detectable fragment)

If the foregoing criteria is met at a scan time, the signal for the scan time in the resulting chromatogram may be the sum of the two precursors having the masses of 400 and 300 thereby omitting any fragment ion intensities.

As a fifth example, consider the following filtering or selection criteria:

Example 5

(M1=400 detectable "precursor or fragment") AND (M2=300 detectable "precursor or fragment") and (M3=60 detectable "precursor or fragment") AND (M4=30 detectable "precursor or fragment")

In example 5, the filtering or selection criteria indicates that each of the specified ion masses may be detected in either or both of the precursor and fragment ion data sets at the same scan time in order for the particular condition to evaluate to true. In this manner, the criteria in example 5 is considered to be met for a scan time if all 4 specified masses appear at the same scan time in any of the precursor and/or fragment ion data sets.

An embodiment may also allow further nesting or logical conditions and use of parenthesis or other suitable syntax to specify an order in which the conditions are evaluated. As a sixth example, consider the following filtering or selection criteria:

Example 6

(M1=500 detectable precursor) AND ((M2=150 detectable fragment") OR (M3=60 detectable fragment) AND (M4=30 detectable fragment))

where the resulting chromatogram only displays a signal for a particular scan time where the precursor ion mass spectral data set has a detectable mass of 500 and also the fragment ion mass spectral data set has one or more detectable masses at one or more of 150, 60 and/or 30 at the same particular scan time. If the scan time meets the foregoing criteria, the resulting chromatogram may include a signal at the scan time having an intensity that is the intensity of the detectable precursor at mass 500. Alternatively, as described elsewhere herein, an embodiment may have the resulting signal intensity be the sum of a first intensity of the precursor ion mass=500 and additionally the one or more intensities of any of the four masses detected at the scan time. For example, the precursor ion with mass=500 having a first intensity in the precursor ion mass spectral data set, a first fragment ion with mass=150 having a second intensity in the fragment ion mass spectral data set, and a second fragment ion with mass=60 in the fragment ion mass spectral data set may be detected at a scan time whereby the resulting signal in the chromatogram for such a scan time may be the sum of the foregoing three intensities.

Some embodiments may also support an intensity ratio descriptor denoting an intensity ratio, such as, for example, denoting a precursor to fragment ratio. More generally, the intensity ratio may denote an intensity ratio filtering criteria between any two ions having masses included in the selection or filtering criteria. For example, consider the following which is a variation of filtering or selection criteria specified in EXAMPLE 1 above with the addition of specifying an intensity ratio descriptor:

Example 7

(M1=400 detectable precursor) AND (M2=150 detectable fragment) Intensity ratio of 3:1 for M1:M2

In Example 7, "Intensity ratio of 3:1 for M1:M2" is one example of an intensity ratio descriptor where "3:1" denotes the intensity ratio criteria between the two ions, M1 and M2, specified in the FOR clause (e.g., M1 has an intensity that is approximately 3 times the intensity of M2 in the scan). In this example, the resulting chromatogram would only display a signal for a particular scan where the precursor ion mass spectral data set has a detectable mass of 400 and also the fragment ion mass spectral data set has a detectable mass of 150 for the same particular scan time, and additionally, the detected intensities for ions of mass 400 and 150 in the scan meet the 3:1 intensity ratio criteria.

It should be noted that an intensity ratio descriptor may have a form or syntax different than as illustrated herein. A single instance of selection or filtering criteria may include multiple intensity ratio descriptors each specifying intensity ratio criteria between any two ions (e.g., two precursors as included in the precursor ion mass spectral data, two fragments as included in the fragment ion mass spectral data, one precursor in the precursor ion mass spectral data and one fragment in the fragment ion mass spectral data). In this example, the two ions to which the intensity ratio is applied may be specified using their mass values or variables as used in the criteria which corresponding to the particular mass values 400 and 150. An embodiment may implement the ratio criteria using a window or tolerance factor so that the ratio is approximate (e.g., 3:1+/−some numeric tolerance or threshold). For example, if the precursor to fragment intensity ratio in a scan is 3.1 to 1, an embodiment may consider the intensity ratio criteria to be met.

As another example, consider use of other logical operations such as the logical OR operator in filtering or selection criteria as in Example 8 below.

Example 8

(M1=143 detectable fragment) OR (M2=213 detectable fragment)

Using the filtering or selection criteria noted above, the resulting chromatogram displayed only includes a non-zero signal intensity at a scan time if an ion having mass of 143 or mass of 213 has been detected at that scan time. Otherwise, the resulting chromatogram includes no resulting signal (intensity of 0) for that scan time. For a scan time at which one or more of the masses 143 and 213 are detected, the displayed chromatogram may include a signal at that scan time having an intensity which is the sum of the ion intensities for those ions in the criteria detected at that scan time. For example, if a first ion having mass 143 and a second ion have mass 213 are both detected at a scan time, the resulting chromatogram includes a signal with an intensity that is the sum of the intensities of both the first and second ions at the scan time.

The foregoing are some examples of filtering or selection criteria that may be specified for filtering the experimental data sets to detect the presence of particular combinations of precursor and/or fragment ions. By determining whether specified criteria has been met, whereby the criteria identifies precursor and/or fragment ions of a known protein or other compound, a determination may be made as to whether the known protein or other compound is present in the analyzed sample. If the criteria is met, it may be determined that the known protein or other compound is present in the analyzed sample. Otherwise, it may be determined that the known protein or other compound is not present in the analyzed sample (e.g., where the resulting chromatogram 330 of FIG. 3 does not include any data points having a non-zero intensity).

One embodiment described herein such as in connection with above-mentioned examples utilizes the described techniques in connection with a particular TOF MS instrument in which no ion selection or filtering is performed in the experiment such that the resulting two raw mass spectral data sets (e.g., precursor ion mass spectral data and fragment ion mass spectral data) include data for all detected ions in the sample. However, techniques herein may be used in other suitable embodiments. For example, the general approach with the embodiment described provides for filtering or "data mining" the raw mass spectral data which includes information on all detected ions such as when operating the mass spectrometer in full scan mode. An embodiment in accordance with techniques herein may more generally be used in connection with filtering the raw mass spectral data which includes information on multiple detected ions which may be less than all possible detectable ions. For example, some mass ion filtering may be performed using the mass spectrometer but such filtering may be limited to a range of masses or multiple selected masses such that the resulting raw mass spectral data sets may be further filtered or data mined using techniques herein.

An embodiment in accordance with the techniques herein may also use other mass spectrometers, such as a triple quadrupole which performs polarity switching. A triple quadrupole mass spectrometer may be used to analyze a sample in a single injection or run whereby polarity switching results in obtaining alternating scans for the different polarities and producing two sets of data, one for each of the two different polarities. In this embodiment, the polarity switching may be performed very quickly as described herein with the high-low protocol experiments (as described in Bateman) whereby the polarity switching between positive and negative ion modes is performed at a rate with a sufficient frequency whereby each of the positive and negative ion polarity modes is applied a plurality of times during a chromatographic peak width. In this type of an experiment, the two raw mass spectral data sets may both be raw precursor ion mass spectral data sets, where one of the sets contains cation mass spectral data (positive ions or primarily bases) and the second of the sets contains anion mass spectral data (negative ions or primarily acids). The techniques herein may be readily applied to associate or combine such two raw mass spectral data sets in a manner similar to that as described herein for the LE scan raw data set and HE scan raw data set obtained from a single data acquisition with the MS operating in accordance with the high-low protocol.

More generally, techniques herein may be applied in connection with any one or more raw mass spectral data sets or files. The data sets or files may be obtained from a single injection or run, or may be obtained from multiple different experiments performed for multiple injections or runs where each such run uses the same or different sample. For example, described herein is an embodiment in which a single run or injection is performed using a TOF MS operating in accordance with the high-low protocol as described in Bateman. In one aspect, the high-low protocol is performing two experiments in parallel with the single injection or run and obtaining two different raw mass spectral data sets, one for each experiment. Techniques herein provide for combining the two raw data sets or files and filtering the combination of data sets or files. Such techniques may be applied for use, more generally, to two or more raw mass spectral data sets or files where such data sets may be obtained from multiple runs or injections. For example, a first injection may be performed using an LC or GC followed by a TOF MS using the high-low protocol as described in Bateman and a first group of two raw mass spectral data sets or files for precursor and fragment ion mass spectral data may be obtained. A second injection may be performed using LC or GC with the TOF MS using the high-low protocol as described in Bateman and a second group of two raw mass spectral data sets or files for precursor and fragment ion mass spectral data may be obtained. The techniques herein may then be applied for use with any two or more of the foregoing 4 data sets or files. The selection criteria may specify conditions, such as mass selection criteria and/or other criteria applicable to any one or more of the 4 data sets or files.

As another example, a first injection may be performed using an LC/MS system where the MS is a triple quadrupole MS performing an MS/MS tandem mass spectrometry experiment in full scan mode whereby for an analyzed sample, MS data is obtained for all precursors and fragments generated from such precursors. Alternatively, the first injection may be performed using a triple quadrupole MS performing an MS/MS tandem mass spectrometry experiment and generating a product ion scan for one or more selected precursor ions. In either case, the MS data obtained for the first injection may be raw data included in a single data file. A second injection may be performed using an LC/MS system where the MS is a TOF MS instrument operating using the high-low protocol as described in Bateman whereby two raw MS data files may be obtained as described herein—the precursor ion mass spectral data and the fragment ion mass spectral data. Techniques herein may be used to apply a selection or filtering criteria across all three of the foregoing data files obtained from the two injections or experimental runs. Such criteria may be used to combine, associate and/or filter information included in such raw data files.

An embodiment in accordance with techniques herein may also include other types of filtering or selection criteria. For example, in addition to the criteria described above, the filtering or selection criteria may also include a mass difference or mass delta value whereby the mass difference may correspond to a chemical or processing variation that occurred during the experiment. For example, the mass difference may correspond to a neutral loss or neutral loss mass difference such as may be performed for a particular class of compounds or a set of compounds having a similar chemical structure. For example, the mass difference may be specified as a numeric value, integer or real number, whereby processing is performed to look for the mass delta value between any two masses at a scan time. If the scan time includes any two masses having the specified mass delta value, then a non-zero signal intensity is included in the resulting chromatogram for that scan time. This mass difference may be applied to a single raw data file, such as only to a single precursor ion mass spectral data file or set, or may be applied across multiple raw data files or set, such as to both the precursor and fragment ion mass spectral data files or sets obtained from a single injection or run using the TOF MS in accordance with the high-low protocol. The intensity of the resulting signal for that scan in the chromatogram may be determined in any suitable manner some of which are described herein. For example, the resulting signal intensity for a scan time meeting the mass difference criteria may be the sum intensity of all ions for that scan time as included in both the precursor and fragment ion mass spectral data, may be the sum intensity of only the precursor and fragment ions meeting the mass difference criteria in that scan time, and the like. To further illustrate, assume a mass difference criteria of 70 denoting 70 Daltons. Each scan may be examined to determine if there are any two masses detected where the difference between such two masses at the same scan time is 70. The foregoing may be performed over the entire range of masses for which data has been collected in the particular one or more raw data files being filtered or mined. If the foregoing mass difference is true for any pair of masses in the same scan time, a non-zero intensity signal is included for that scan time in the resulting chromatogram. The resulting signal intensity may be, for example, the sum intensity of all pairs of masses meeting the mass difference criteria.

Thus, in one use, the foregoing mass difference criteria may be used to extract and display associated data based on a neutral mass difference in order to plot extracted neutral loss (xNLoss) chromatograms. Since many classes of compounds exhibit the same neutral loss, this capability may be used, for example, to identify the presence or absence of members of a target compound class and to allow quantitation of the group. This type of data targeting and quantitation may be applied, for example, in petroleum and fuel analyses but is, of course, not limited to this application area. Additionally, use of the mass difference criteria may be used to target compound classes that may be characterized by a common delta mass indicative of the loss of a charged species. In other words every peak for a compound class would be displayed but by using a known charged mass loss/difference that characterizes all class members. As yet another example, the mass difference may correspond to a mass difference for an isotopic variation. More generally, the mass difference included in the mass difference criteria may represent any suitable mass difference whereby the resulting chromatogram may include non-zero intensity signals for scan times meeting the mass difference criteria.

Generally, any one or more of the different selection or filtering criteria described herein may be included in an embodiment alone, or in combination with one or more other criteria. For example, an embodiment may include the mass difference or mass delta value criteria alone, or in combination with, other suitable criteria some examples of which are described herein. The mass delta criteria may be combined with other criteria described herein such as using a logical operation such as AND. Additionally, an embodiment may allow for specifying multiple instances or occurrences of mass difference criteria (e.g., two or more mass difference values).

As described herein with above-mentioned examples, the selection or filtering criteria, such as applied to the two raw mass spectral data sets or files (e.g., precursor and fragment ion data) obtained from using a TOF mass spectrometer operating in accordance with the high-low technique of Bateman in full scan mode (e.g., no ion filtering), may be used to specify two masses so that the resulting chromatogram corresponds to extracted MRM (xMRM) traces. Both masses must be present at a scan time in order for a point on a chromatogram to be plotted. As also described herein, multiple product ions may be associated with the same precursor and criteria may be specified for masses of such product ions and the precursor whereby the resulting chromatogram includes a non-zero signal only at scan times including all such specified masses. As also described herein, when criteria includes multiple ions, an embodiment may also allow for designating the particular raw data set or file (e.g., precursor and/or fragment ion mass spectral data file) in which each is expected. Specifying multiple precursor masses, for example, allows characteristic isotope patterns of precursors to be included in the selection or filtering criteria. By allowing isotope patterns and multiple product ions to be specified in the selection or filtering criteria, the criteria may be used to allow data mining or filtering to detect the presence or absence of individual target compounds.

In one aspect, techniques herein may be used in an embodiment to simulate filtering and ion selection performed that may typically be performed by hardware of the MS instrument such as, for example, the triple quadrupole MS instrument with two stages of mass filtering when performing an MRM experiment. For example, raw MS scan data may be obtained when the MS instrument operates in full scan mode for the high and low energy scans. The raw MS scan data may be included in a single data set or file, such as when performing MS/MS analysis or may be included in two data sets or files, such as when operating the MS in accordance with the high-low protocol described in Bateman. In this manner, the raw MS scan data may be used repeatedly over time with techniques herein for data mining purposes using the techniques herein that simulate the filtering and ion selection performed by the hardware of the MS instrument. In this manner, a same one or more sets of raw MS data may be analyzed multiple times using different criteria with techniques herein rather than requiring repeating experiments using the MS hardware for filtering and ion selection based on the different criteria.

Figure 6:
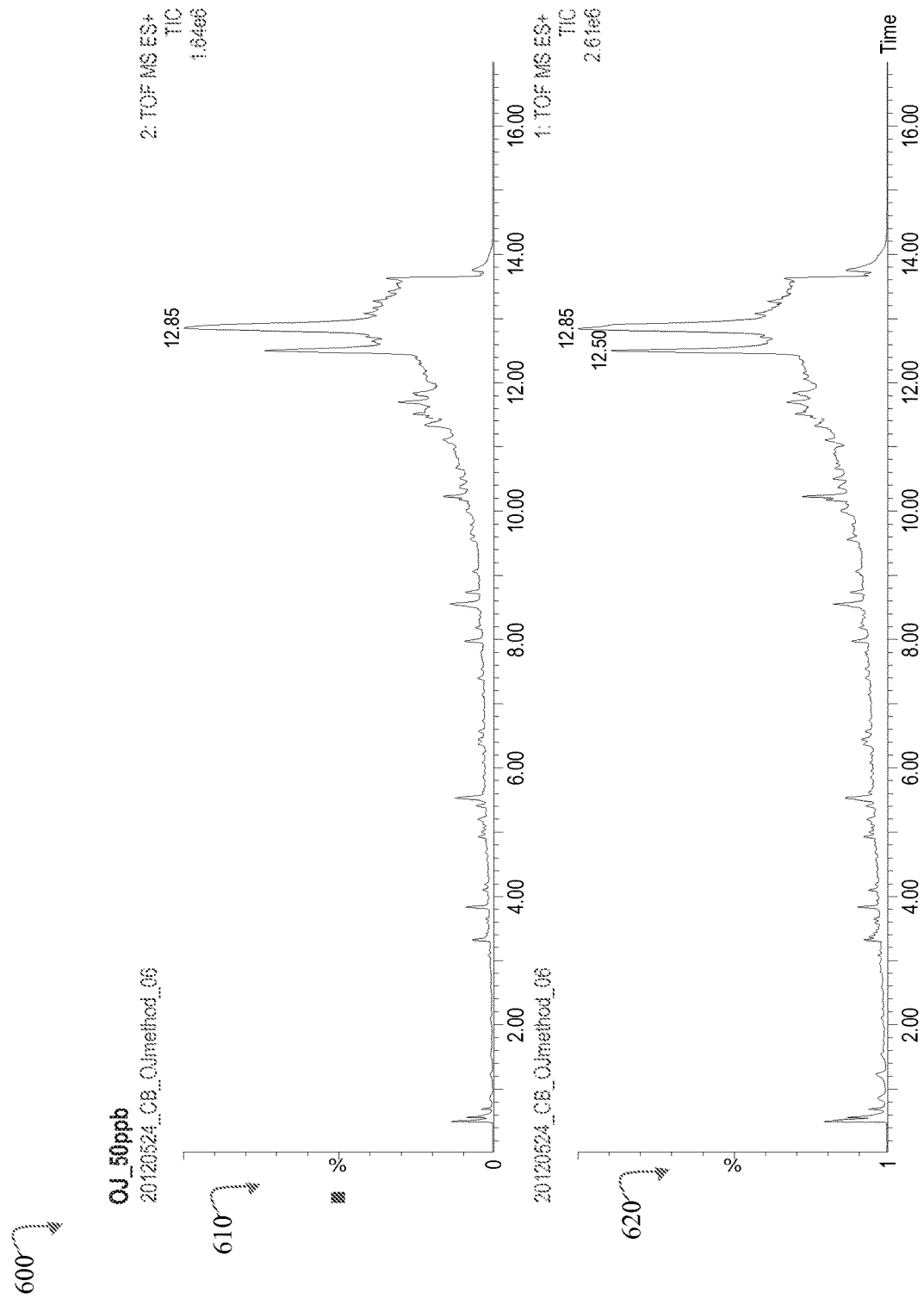
FIGS. 6, 7, 8, 9, 10, 11, 12 and 13 are chromatograms illustrating use of techniques herein in an exemplary embodiment.

The techniques herein may be used for target analysis to determine whether a particular target analyte is present in a sample by specifying in the filtering or selection criteria one or more ions (e.g., one or more precursors and one or more fragments produced from the one or more precursors) characteristic of the analyte. For example, as described elsewhere herein, the filtering or selection criteria may identify a precursor mass and one or more masses of fragments expected to be produced from the originating precursor. Using the criteria as illustrated elsewhere herein, a logical expression may be formed using the logical AND operator requiring the presence of all such ions of the specified masses at the same scan time whereby the scan time may correspond to a retention time, for example, in an LC/MS experiment. In this manner, a resulting chromatogram that does not include any data points (e.g., including only zero-intensity signals at each scan time) may confirm that the analyzed sample does not include the target analyte typically identified by the presence of the precursor and associated one or more fragments specified in the criteria. Additionally, To further illustrate with graphical displays, reference is made to FIG. 6. In the example 600 of FIG. 6, shown is an example of chromatograms that may be obtained for raw MS data obtained through operating the MS in accordance with the high-low protocol as described in Bateman for a single experimental run analyzing a sample. The sample may be known to include the target analyte aldicarb sulfoxide eluting at a corresponding scan time of 2.6 mins. Characteristic of this target analyte are a precursor mass of 207 and an associated fragment mass of 89.

In chromatograms in FIG. 6 and others herein, ion intensity (scaled to a percentage) is on the Y axis and scan times are on the X axis. The graph 610 is a chromatogram of the HE scan raw data set and the graph 620 is a chromatogram of the LE scan raw data set for this single experiment with no filtering (e.g., full scan mode for both high and low energy).

Figure 7:
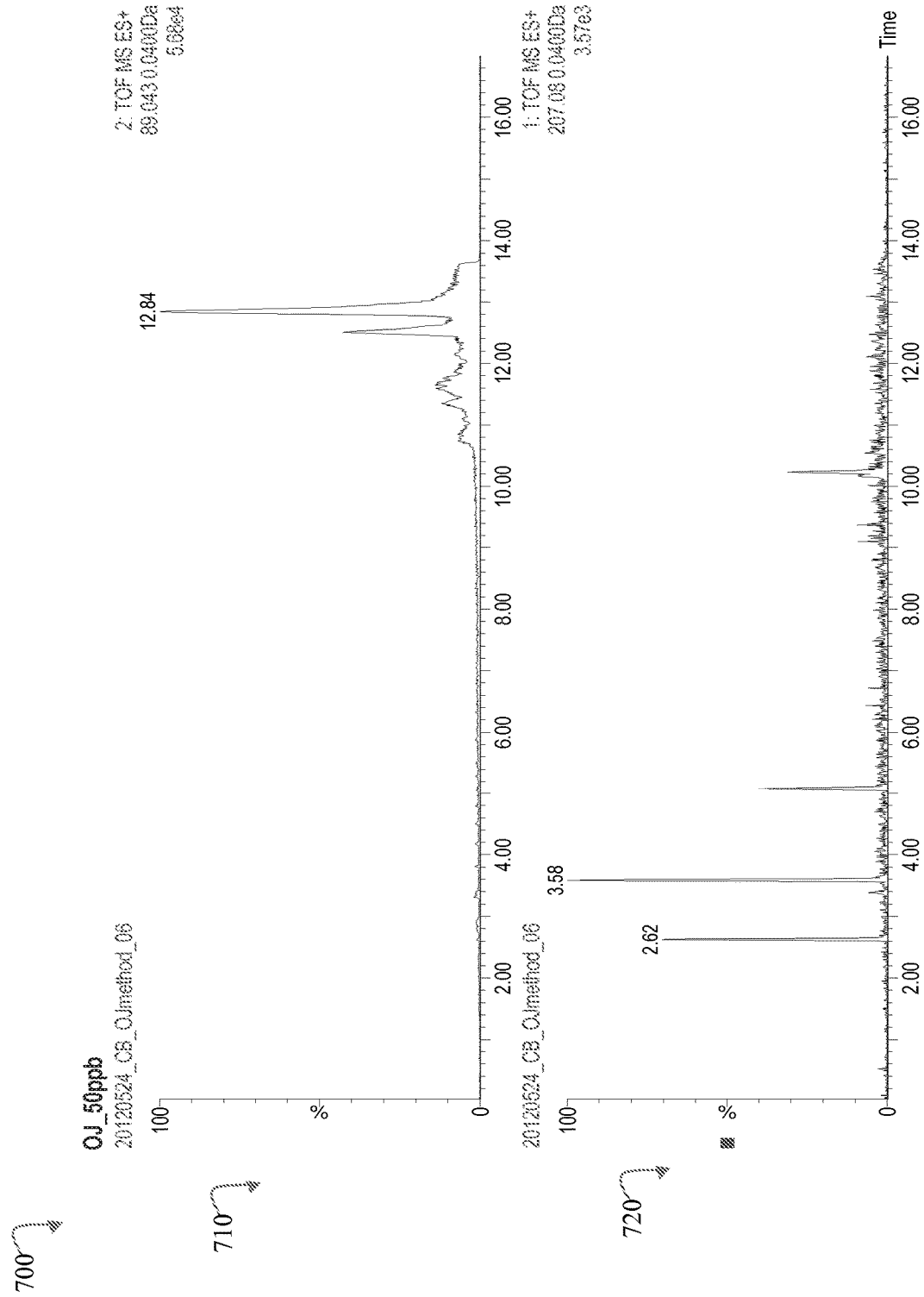

Referring to FIG. 7, shown is an example 700 based on the data from FIG. 6 for two XICs (extracted ion chromatograms). The graph 710 is an XIC for mass=89 Daltons extracted from the HE scan raw data set 610. The graph 720 is an XIC for mass=207 Daltons extracted from the LE scan raw data set 620. The graphs of 700 illustrate a problem in that it is difficult to visually observe the displayed data and detect what peaks are important or of significance due to the additional "noise" in the displayed data. The chromatograms of FIG. 7 may be obtained, for example, using other post processing software operating on that performs processing on each of the LE and HE scan raw data sets 610, 620 of FIG. 6 separately. In other words, 710 is the result of processing 610 data to selectively only display an ion intensity for mass=89 at each scan time, and 720 is the result of processing 620 data to selectively only display an ion intensity for mass=207 at each scan time.

Figure 8:
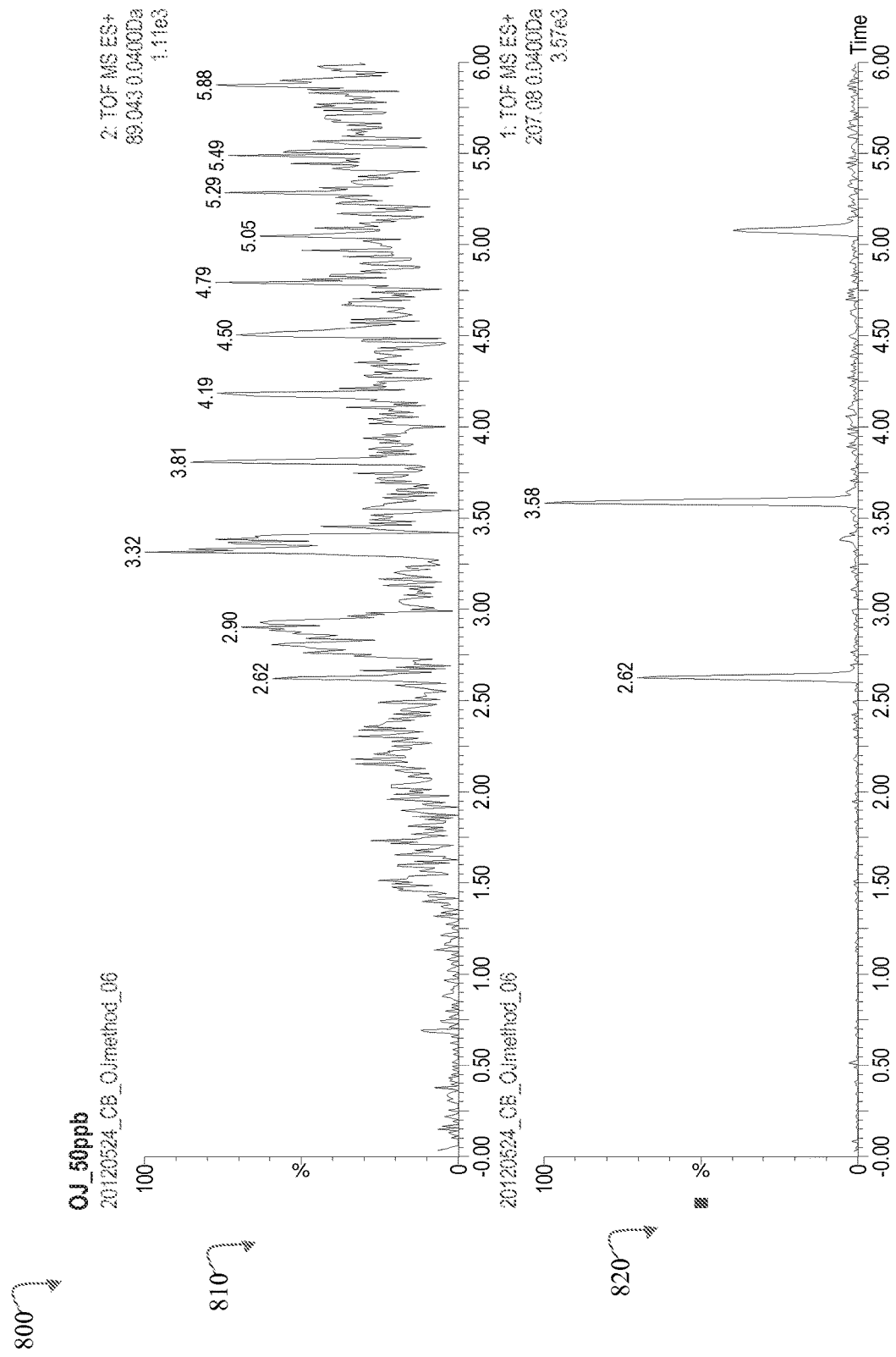

Referring to FIG. 8, shown is an example 800 based on XICs from FIG. 7. The graph 810 is a chromatogram based on the data from 710 that is an XIC for mass=89 Daltons for only a portion of the scan time 0 through 6 minutes. The graph 820 is a chromatogram based on the data from 720 that is an XIC for mass=270 Daltons for only a portion of the scan time 0 through 6 minutes.

Figure 9:
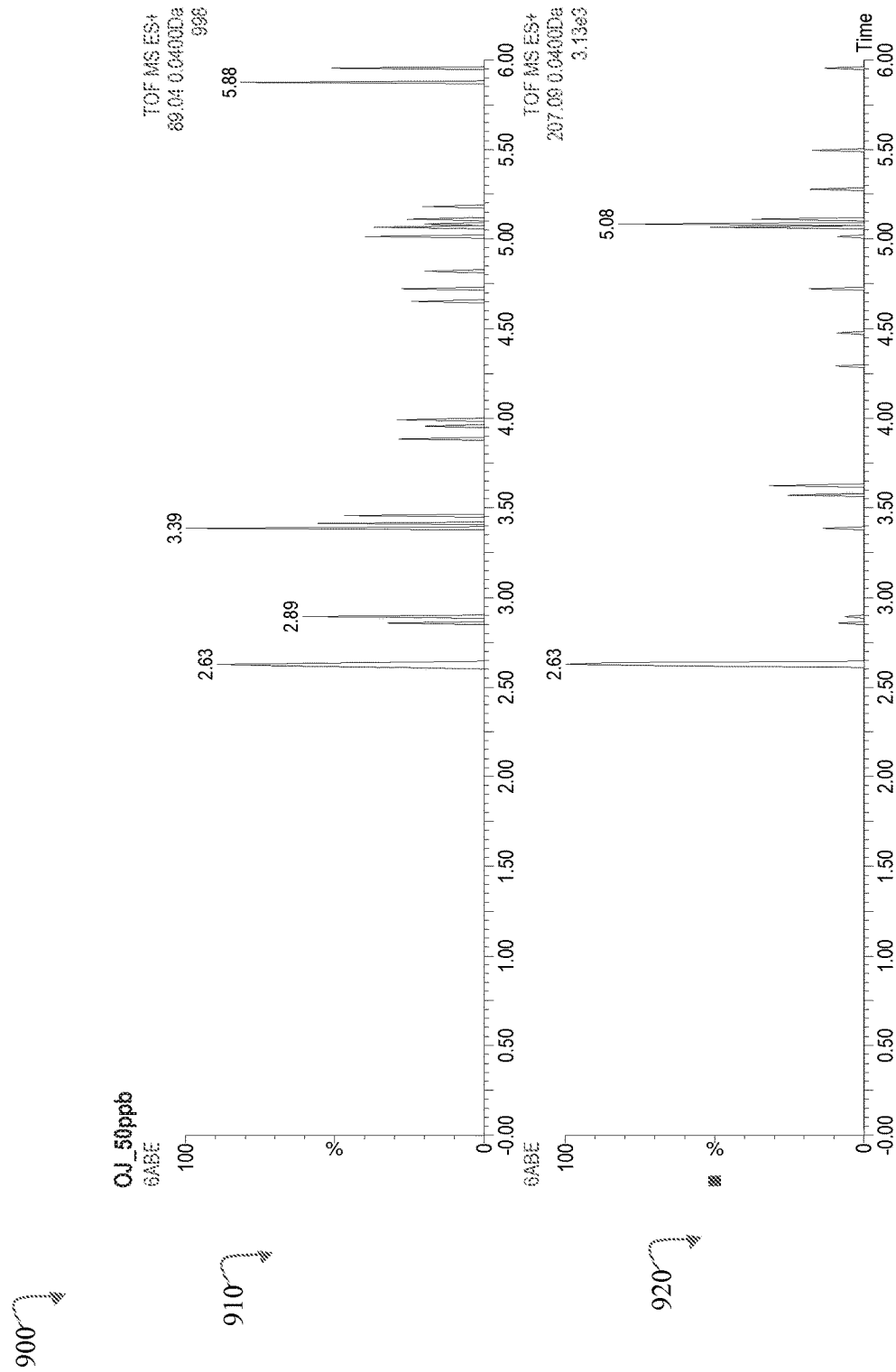

Referring to FIG. 9, shown is an example 900 illustrating resulting chromatograms that may be displayed in an embodiment in accordance with techniques herein that associate and process both the data sets 810 and 820 in accordance with selection or filtering criteria. The selection or filtering criteria may specify to only display a resulting ion intensity for a scan time if mass=89 Daltons is detected in the HE scan raw data set (620 of FIG. 6) and mass=207 is detected in the LE scan raw data set (610 of FIG. 6) detected at that scan time. Thus, expressed in format and syntax used in examples above, the selection or filtering criteria may be represented as:

(M1=207 detectable precursor) AND (M2=89 detectable fragment)

The example 900 includes a resulting chromatogram 910 generated based on data of chromatogram 810 of FIG. 8 whereby the resulting chromatogram 910 includes a signal having a non-zero intensity at a scan time only if the above-mentioned criteria (with respect to both the HE and LE scan raw data sets) is met for that scan time. In 910, at such a scan time meeting the criteria, the intensity for that scan time is the intensity of the detected fragment having a mass of 89. In this manner, 910 may represent a filtered view of 810 which includes a signal having an intensity of the detected fragment with mass=89 at a scan time only if the fragment with mass=89 is detected at that scan time in the HE scan raw data set (e.g., 810) and also the precursor with mass=207 is detected at that scan time in the LE scan raw data set (e.g., 820).

The example 900 also includes a resulting chromatogram 920 generated based on data of chromatogram 820 of FIG. 8 whereby the resulting chromatogram 920 includes a signal having a non-zero intensity at a scan time only if the above-mentioned criteria (with respect to both the HE and LE scan raw data sets) is met for that scan time. In 920, at such a scan time meeting the criteria, the intensity for that scan time is the intensity of the detected precursor having a mass of 270. In this manner, 920 may represent a filtered view of 910 which includes a signal having an intensity of the detected precursor with mass=207 at a scan time only if the fragment with mass=89 is detected at that scan time in the HE scan raw data set (e.g., 810) and also the precursor with mass=207 is detected at that scan time in the LE scan raw data set (e.g., 820).

The example 900 illustrates yet another way in which the results of the selection or filtering criteria as applied to both the LE and HE scan raw data sets may be displayed. in which both 910 and 920 each include a zero-intensity signal at a scan time if the specified criteria is not met (e.g, does not evaluate to true) at that scan time. Otherwise the scan time includes a non-zero intensity determined as noted above. Alternatively, an embodiment may display a single resulting chromatogram based on 910 and 920 that is the sum of the intensities from 910 and 920 at each scan time.

It should be noted that the chromatograms 910 and 920 (such as in comparison to the XICs of FIG. 8) have a significant reduction of noise and elimination of non-target chromatographic peaks (e.g., peaks not of interest as pertaining to the particular masses of interest).

Figure 10:
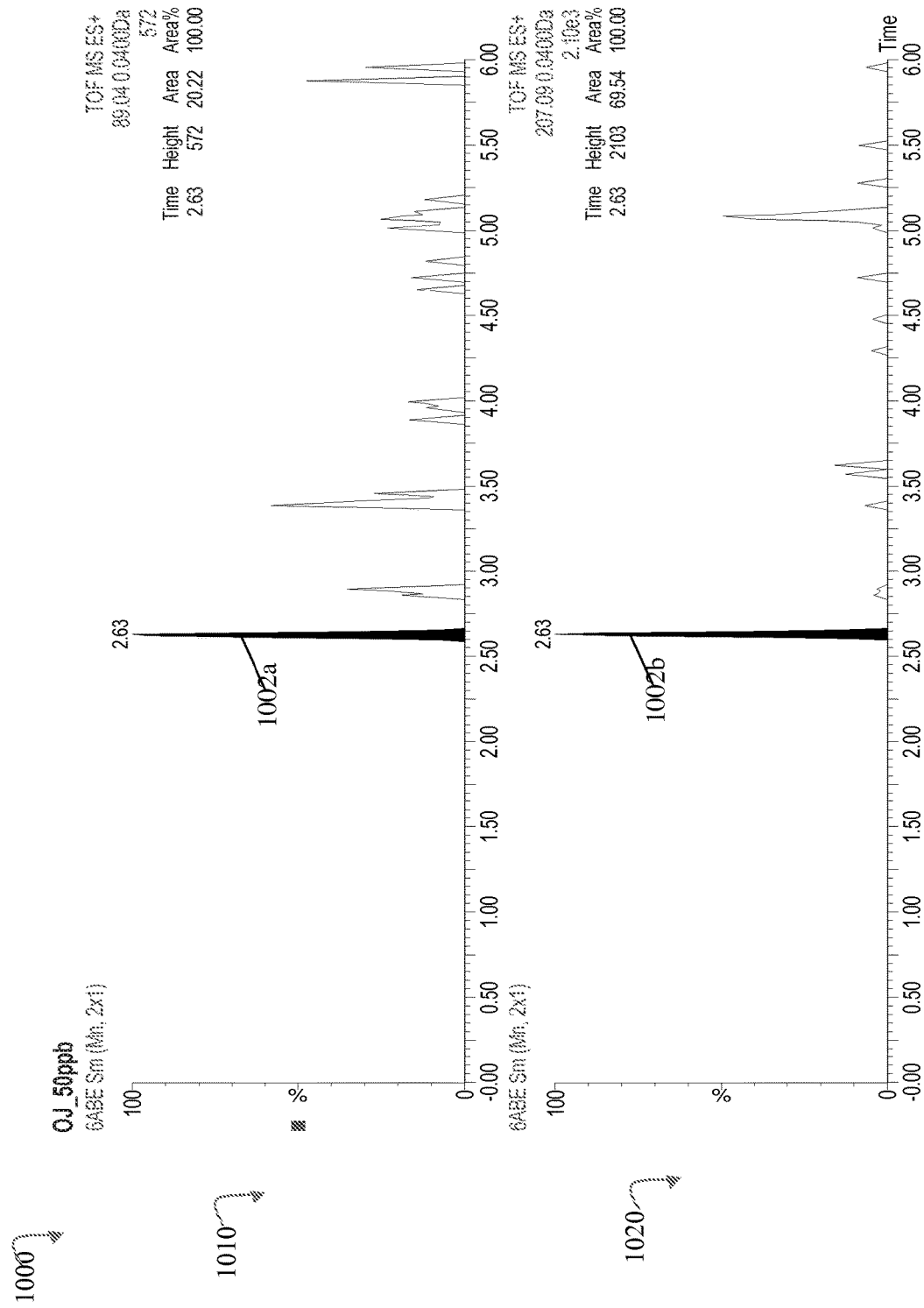

The chromatograms of FIG. 10 illustrate the same chromatograms as in FIG. 9 where integration has been performed with respect to peaks or the darkened curves 1002a and 1002b. Such processing may include determining the area under the curve for purposes of quantitation. The darkened curves 1002a and 1002b may correspond to the largest peaks in the chromatograms and integration may be performed with respect to such peaks at scan time 2.6 to quantify the target analyte of interest where the quantity may be expressed as relative ratio of precursor intensity to fragment intensity. Based on the area 69.54 obtained for the curve 1002b for precursor (bottom scan data 1020) and the area 20.22 obtained for the curve 1002a for the fragment (top scan data 1010), the area ratio is 3.44:1 and the expected standard ratio at 1000 ppb is 3.6:1. Thus, upon integration using the filtered chromatograms of FIG. 10 generated in accordance with techniques herein, the ratio at 3.44:1 for the target analyte is in good agreement (e.g. within 4% error) of a known standard run at 1000 ppb which gave a ratio of 3.58:1. This demonstrates the quantitative nature of the process of associating the data between the LE and HE scan data.

Figure 11:
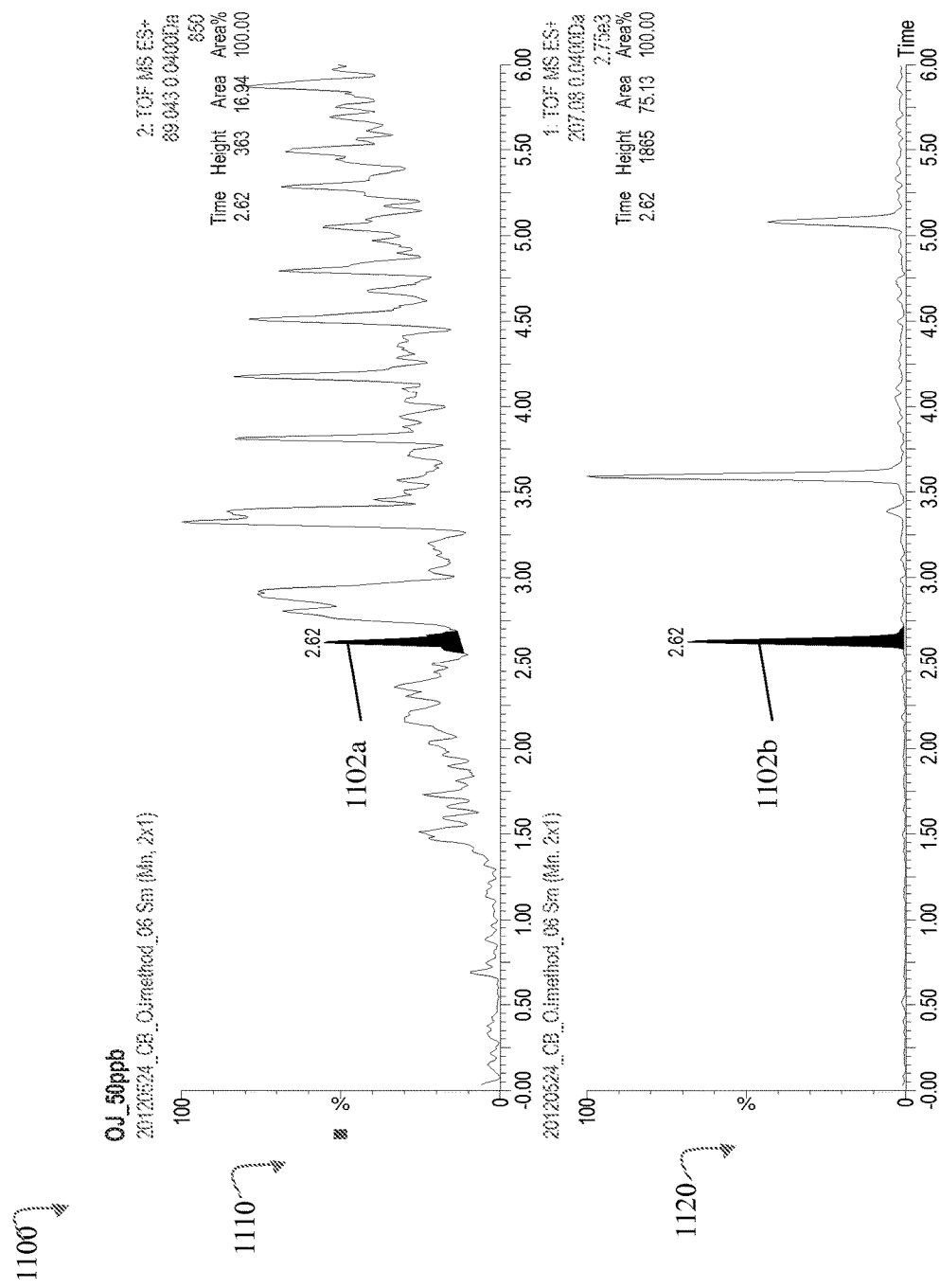

The chromatograms of FIG. 11 illustrate the same chromatograms as in FIG. 8 where, in a manner similar to that as described above for FIG. 10, integration has been performed with respect to the peaks or the darkened curves 1102a and 1102b at the scan time of 2.6 minutes for the target analyte to again determine a precursor to target ratio for quantification. Based on the area 75.13 obtained for the curve 1102b for precursor (bottom scan data 1120) and the area 16.94 obtained for the curve 1102a for the fragment (top scan data 1110), the area ratio is 4.32:1 1000 ppb and the expected standard ratio is 3.6:1. Thus, the area ratio for the same analyte calculated from the original data of FIG. 8 (rather than from the resulting filtered data generated as a result of applying the selection criteria to the LE and HE scan raw data sets) is 4.32:1 having a 20%+error with respect to the expected standard ratio noted above. The foregoing error is a reflection of the low selectivity of the XIC generated for mass=89 (e.g., 810 of FIG. 8).

Figure 12:
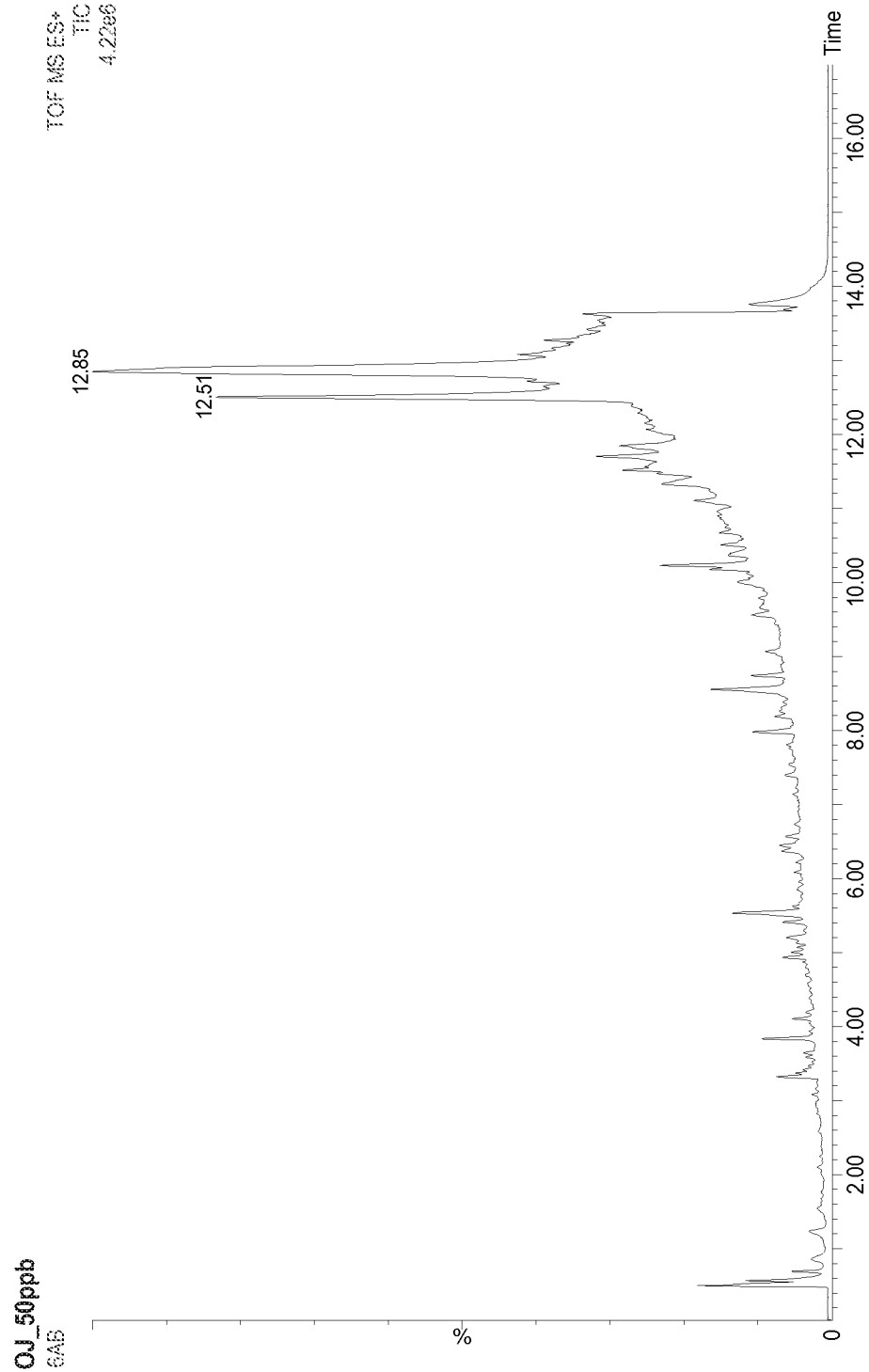

Referring to FIG. 12, shown is a chromatogram that is the sum of the chromatograms 610 and 620 from FIG. 6 (e.g., FIG. 12 is the TIC (total ion chromatogram) that is the result of summing the TICs 610 and 620 of FIG. 6).

Figure 13:
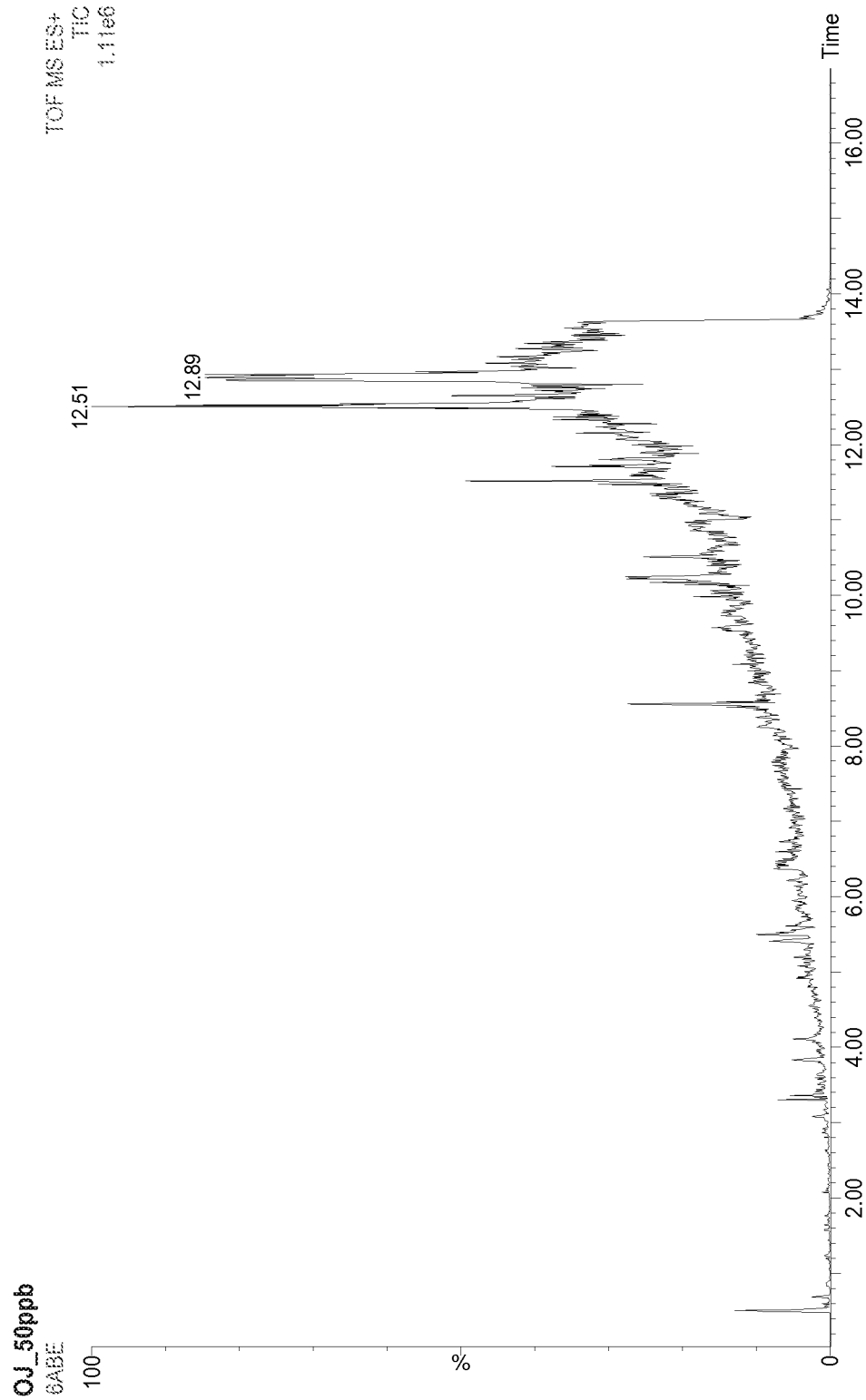

Referring to FIG. 13, shown is a chromatogram that is the sum of the chromatograms 910 and 920 from FIG. 9 but for all scan times 0 to 16 minutes. Thus, FIG. 13 illustrates an example of a resulting chromatogram 330 that may be displayed as a result of processing performed in an embodiment in accordance with techniques herein.

The foregoing FIGS. 6-13 is an example illustrating how raw MS data obtained from an experiment operating the MS instrument in accordance with the high-low protocol as described in Bateman suffers from low selectivity for target analysis due to the decoupled nature in which analysis is performed on the two raw data sets 302 and 204 (e.g., the two chromatograms that make up a single MS data acquisition). Selectivity and sensitivity (e.g., signal to noise) can be improved through processing the two raw data sets by applying the selection or filtering criteria as described herein to generate a resulting chromatogram having a non-zero intensity at a scan time only of the filtering or selection criteria is true. The resulting chromatogram would be plotted only, in the example presented, for scan times denoted by points where mass=207 appears in the LE scan raw data set AND 89 appears in HE scan raw data set. As described herein, the resulting chromatograms provide for improved precision and accuracy of integration and in quantitative analysis (e.g., the precursor to fragment ratio) of a target analyte.

Figure 14:
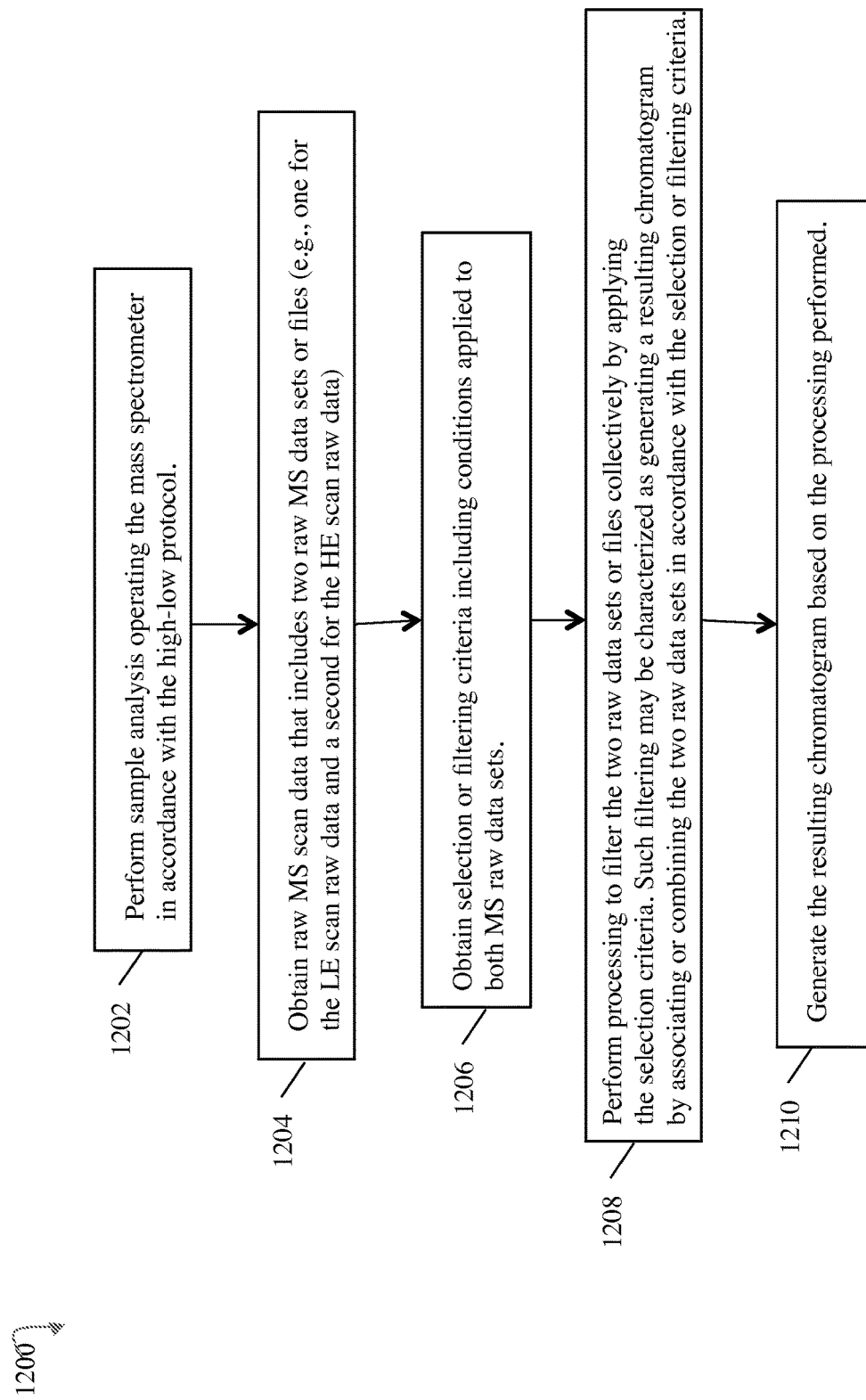
FIGS. 14 and 15 are flowcharts of processing steps that may be performed in an embodiment in accordance with techniques herein.

Referring to FIG. 14, shown is a first flowchart of processing steps that may be performed in an embodiment in accordance with techniques herein. The flowchart 1200 generally summarizes processing described above that may be performed to combine and filter multiple raw MS data sets or files obtained from performing a single MS experiment where the MS instrument operates in accordance with the high-low protocol as described in Bateman resulting in LE and HE raw data sets (e.g., see FIG. 3). At step 1202, sample analysis is performed operating the mass spectrometer in accordance with the high-low protocol to generate two raw MS data sets from the single experiment in step 1204. The two raw MS data sets or files include a first for the LE scan raw data and a second for the HE scan raw data. At step 1206, selection or filtering criteria is obtained including conditions applied to both MS raw data sets. At step 1208, processing is performed to filter the two raw MS data sets or files collectively by applying the selection criteria. Such filtering may be characterized as generating a resulting chromatogram by associating or combining the two raw data sets in accordance with the selection or filtering criteria. At step 1210, the resulting chromatogram is generated based on the processing performed in step 1208.

Figure 15:
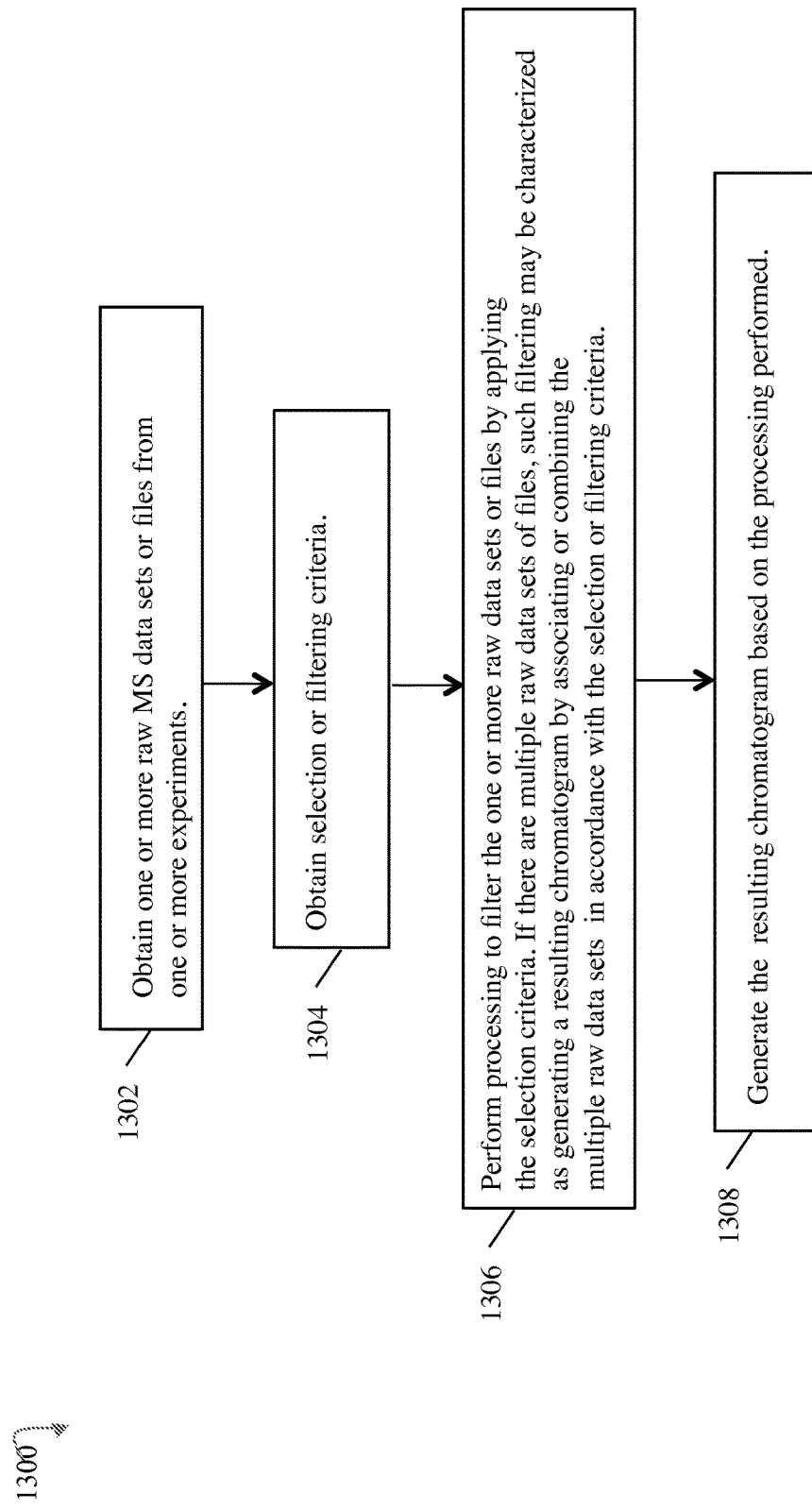

Referring to FIG. 15, shown is a second flowchart of processing steps that may be performed in an embodiment in accordance with techniques herein. The flowchart 1300 generally summarizes processing described above that may be performed with respect to filtering one or more raw MS data sets or files obtained from performing one or more MS experiments. Steps of 1300 further generalize processing and techniques described herein. At step 1302, one or more raw MS data sets or files are obtained from one or more experiments. At step 1304, selection or filtering criteria is obtained. At step 1306, processing is performed to filter the one or more raw MS data sets or files by applying the selection criteria. If there are multiple raw data sets or files, such filtering may be characterized as generating a resulting chromatogram by associating or combining the multiple raw data sets in accordance with the selection or filtering criteria. At step 1308, the resulting chromatogram is generated based on the processing performed in step 1306.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method of processing mass spectral data comprising:
accessing raw mass spectral data representing data collected from a mass spectrometer prior to being processed by performing peak detection, mapping or translating raw scan times to corresponding retention times or drift times, performing retention time alignment, or associating precursor and fragment or product ions as originating from a same originating molecule based on common retention times of such ions, the raw mass spectral data comprising precursor ion data and fragment ion data for a plurality of scans generated during a mass analysis experiment of a sample, wherein said precursor ion data comprises raw mass spectral data acquired during a low energy mode of the mass analysis experiment and said fragment ion data comprises raw mass spectral data acquired during an elevated energy mode of the mass analysis experiment;

specifying a set of selection criteria configured to be applied to the raw mass spectral data, the selection criteria comprising a first mass value, a second mass value, and a logical operation applied to the first mass value and the second mass value;

selectively generating a chromatogram based on applying the set of selection criteria to the raw mass spectral data by:
presenting a non-zero signal intensity only at scan times corresponding to when said precursor ion data and said fragment ion data in the raw mass spectral data meet the set of selection criteria, and
indicating a zero signal intensity at remaining scan times corresponding to when said precursor ion data and said fragment ion data in the raw mass spectral data do not meet the set of selection criteria.

2. The method of claim 1, wherein the mass analysis experiment comprises performing at least one of a chromatographic separation and an ion mobility spectrometry.

3. The method of claim 1, wherein the first mass value identifies a first mass of an ion in the precursor ion data, the second mass value identifies a second mass of an ion in the fragment ion data, and the logical operation is a logical AND operation.

4. The method of claim 3, wherein the non-zero signal intensity is determined as a sum of intensities comprising intensities of the first detected ion in the precursor ion data and the second detected ion in the fragment ion data.

5. The method of claim 3, wherein the non-zero signal intensity has a value based on one or more intensities of detected ions at said each of said plurality of scan times in the precursor ion data, the one or more intensities comprising an intensity of the first detected ion.

6. The method of claim 3, wherein the non-zero signal intensity has a value based on one or more intensities of detected ions at said each scan time in the fragment ion data, the one or more intensities comprising an intensity of the second detected ion.

7. The method of claim 1, wherein the logical operation comprises one of a logical AND operation, a logical OR operation, a logical exclusive-or (XOR) operation, a logical negation operation, a logical NXOR operation, a logical NOR operation, and a logical NAND operation.

8. The method of claim 1, wherein the mass spectrometer operates in a full scan mode with no mass filtering in acquiring the precursor ion data, wherein the precursor ion data comprises all ions detectable by mass spectrometer when operating in the low energy mode.

9. The method of claim 1, wherein the mass spectrometer operates in a full scan mode with no mass filtering in acquiring the fragment ion data, wherein the fragment ion data comprises all ions detectable by the mass spectrometer when operating in the elevated energy mode.

10. The method of claim 1, wherein the raw mass spectral data comprises a plurality of scan times and, for each of said plurality of scan times, one or more masses of each ion detected during said each of said plurality of scan times, and an intensity of each ion.

11. The method of claim 1, wherein the set of selection criteria comprises an intensity ratio of one of a first precursor intensity to a second precursor intensity in the precursor ion data or a first fragment intensity to a second fragment intensity in the fragment ion data.

12. The method of claim 3, wherein the set of selection criteria is applied to the precursor ion data and the fragment ion data to identify a target analyte, and the first mass value and the second mass value each identify a mass of an ion characteristic of the target analyte, wherein said chromatogram indicating the zero signal intensity for one of said plurality of scan times indicates that the target analyte is not present in the sample.

13. A system comprising:
a memory comprising code; and
a processor coupled to the memory that, responsive to executing the code, causes the system to:
access raw mass spectral data representing data collected from a mass spectrometer prior to being processed by performing peak detection, mapping or translating raw scan times to corresponding retention times or drift times, performing retention time alignment, or associating precursor and fragment or product ions as originating from a same originating molecule based on common retention times of such ions, the raw mass spectral data comprising precursor ion data and fragment ion data for a plurality of scans generated during a mass analysis experiment of a sample, wherein said precursor ion data comprises raw mass spectral data acquired during a low energy mode of the mass analysis experiment and said fragment ion data comprises raw mass spectral data acquired during an elevated energy mode of the mass analysis experiment;
specify a set of selection criteria configured to be applied to the raw mass spectral data, the selection criteria comprising a first mass value, a second mass value, and a logical operation applied to the first mass value and the second mass value;
selectively generate a chromatogram based on applying the set of selection criteria to the raw mass spectral data by:
presenting a non-zero signal intensity only at scan times corresponding to when said precursor ion data and said fragment ion data in the raw mass spectral data meet the set of selection criteria, and
indicating a zero signal intensity at remaining scan times corresponding to when said precursor ion data and said fragment ion data in the raw mass spectral data do not meet the set of selection criteria.

14. A computer-implemented method comprising, by a processor of a computer system:
accessing raw mass spectral data representing data collected from a mass spectrometer prior to being processed by performing peak detection, mapping or translating raw scan times to corresponding retention times or drift times, performing retention time alignment, or associating precursor and fragment or product ions as originating from a same originating molecule based on common retention times of such ions;
specifying at least one mass difference selection criterion comprising a mass difference value;
determine at least one data point by applying the at least one mass difference selection criterion to at least a portion of a plurality of scan times of the raw mass spectral data, the at least one data point corresponding to a scan time of the plurality of scan times where at least two ions have masses separated by the mass difference value in the raw mass spectral data; and
generate a chromatogram based on applying the at least one mass difference selection criterion to the raw mass spectral data, the chromatogram displaying the data point at the scan time of the plurality of scan times, and not displaying data for remaining scan times of the plurality of scan times.

15. The method of claim 14, wherein the mass difference value identifies neutral mass difference.

16. The system of claim 14, wherein the mass difference value identifies a loss of a charged species of a target compound class.

17. The system of claim 14, wherein the mass difference value indicates a mass difference for an isotopic variation.

18. The system of claim 14, wherein the raw mass spectral data comprises precursor ion data and fragment ion data for a plurality of scans generated during a mass analysis experiment of a sample, wherein said precursor ion data comprises raw mass spectral data acquired during a low energy mode of the mass analysis experiment and said fragment ion data comprises raw mass spectral data acquired during an elevated energy mode of the mass analysis experiment;

specifying a set of selection criteria comprising a first mass value associated with a precursor ion and a second mass value associated with at least one fragment ion;

determine the at least one data point by applying the set of selection criteria to the raw mass spectral data, the at least one data point corresponding to a scan time of the plurality of scan times where both the first mass value and the second mass value are detected and at least two ions have masses separated by the mass difference value.

19. The method of claim 1, the raw mass spectral data comprising data not obtained from a chromatogram.

20. The method of claim 1, the raw mass spectral data not comprising retention time data.

* * * * *